US 11,905,849 B2

(12) United States Patent
Spangler et al.

(10) Patent No.: US 11,905,849 B2
(45) Date of Patent: Feb. 20, 2024

(54) COOLING SCHEMES FOR AIRFOILS FOR GAS TURBINE ENGINES

(71) Applicant: RTX Corporation, Farmington, CT (US)

(72) Inventors: Brandon W. Spangler, Vernon, CT (US); David R. Pack, Gold Canyon, AZ (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/967,252

(22) Filed: Oct. 17, 2022

(65) Prior Publication Data

US 2023/0130326 A1    Apr. 27, 2023

Related U.S. Application Data

(60) Provisional application No. 63/270,166, filed on Oct. 21, 2021.

(51) Int. Cl.
*F01D 5/18* (2006.01)
*F01D 5/14* (2006.01)

(52) U.S. Cl.
CPC ............ *F01D 5/187* (2013.01); *F01D 5/147* (2013.01); *F05D 2240/303* (2013.01); *F05D 2240/304* (2013.01); *F05D 2240/305* (2013.01); *F05D 2240/306* (2013.01); *F05D 2250/11* (2013.01); *F05D 2260/201* (2013.01); *F05D 2260/22141* (2013.01)

(58) Field of Classification Search
CPC .......... F01D 5/186; F01D 5/187; F01D 5/147; F05D 2260/201
See application file for complete search history.

(56) References Cited

U.S. PATENT DOCUMENTS

| 5,155,626 | A |   | 10/1992 | Lee et al. |
| 5,562,409 | A | * | 10/1996 | Livsey ................... F01D 5/187 415/115 |
| 6,206,638 | B1 | * | 3/2001 | Glynn ..................... F01D 5/187 415/115 |
| 6,984,103 | B2 | * | 1/2006 | Lee ......................... F01D 5/187 415/115 |

(Continued)

OTHER PUBLICATIONS

Extended European Search Report, EP Application No. 22203149.4-1004; dated Jun. 27, 2023, 8 pages.

*Primary Examiner* — Topaz L. Elliott
*Assistant Examiner* — Michael K. Reitz
(74) *Attorney, Agent, or Firm* — CANTOR COLBURN LLP

(57) ABSTRACT

Airfoils and core assemblies for such airfoils are described. The airfoils include a leading edge cavity defined, in part, by a leading edge interior rib and a trailing edge cavity defined, in part, by a trailing edge interior rib. A plurality of pressure side cavities are defined by pressure side skin cavity walls with at least one pressure side skin cavity wall not extending to the suction side wall. A plurality of suction side cavities are defined by suction side skin cavity walls with at least one suction side skin cavity wall not extending to the pressure side wall. A main body cavity extends between the leading edge interior rib and the trailing edge interior rib and the plurality of side cavities are arranged in a staggered pattern to define the bounds of the main body cavity.

18 Claims, 12 Drawing Sheets

(56) References Cited

U.S. PATENT DOCUMENTS

| | | |
|---|---|---|
| 7,131,818 B2 | 11/2006 | Cunha et al. |
| 7,217,092 B2 | 5/2007 | Lee et al. |
| 7,871,245 B2 | 1/2011 | Pietraskiewicz et al. |
| 8,070,442 B1 | 12/2011 | Liang |
| 10,378,364 B2 | 8/2019 | Spangler et al. |
| 10,550,701 B2 * | 2/2020 | Kiener .................... F01D 5/186 |
| 10,605,090 B2 * | 3/2020 | Leary ........................ F01D 9/02 |
| 10,871,074 B2 | 12/2020 | Spangler et al. |
| 2003/0044277 A1 | 3/2003 | Bourriaud et al. |
| 2017/0328211 A1 | 11/2017 | Leary et al. |
| 2020/0347734 A1 | 11/2020 | Spangler et al. |
| 2020/0392852 A1 * | 12/2020 | Eshak ..................... F01D 5/147 |

* cited by examiner

COOLING SCHEMES FOR AIRFOILS FOR GAS TURBINE ENGINES

CROSS-REFERENCE TO RELATED APPLICATION

This application claims the benefit of priority to U.S. Provisional Application No. 63/270,166, filed Oct. 21, 2021, the disclosure of which is incorporated herein by reference in its entirety.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate, and compress the working fluid flow, or to generate lift for conversion to rotational energy in the turbine.

The compressor section and the turbine section each have airfoils including rotating blades and stationary vanes. It may be desirable to provide a cooling (or heating in the case of the compressor section) airflow through the airfoils due to the relatively great temperatures at which they are operated. In that regard, the airfoils may include exterior walls along with internal ribs or walls that form internal air passages through which a cooling airflow may flow. Because the exterior walls are exposed to relatively hot gaspath air, they may experience greater thermal expansion than the internal ribs or walls. Such difference in thermal expansion undesirably results in compressive and tensile stress experienced between the exterior walls and the internal ribs or walls.

BRIEF DESCRIPTION

According to some embodiments, airfoils for gas turbine engines are provided. The airfoils include an airfoil body having a leading edge, a trailing edge, a pressure side wall extending between the leading edge and the trailing edge and defining a pressure side, and a suction side wall extending between the leading edge and the trailing edge and defining a suction side, wherein a plurality of cooling passages are formed within the airfoil body, a leading edge cavity defined within the airfoil body and defined along the leading edge to provide cooling to the leading edge of the airfoil, wherein a leading edge interior rib defines an aft extent of the leading edge cavity, a trailing edge cavity defined within the airfoil body and defined along the trailing edge to provide cooling to the trailing edge of the airfoil, wherein a trailing edge interior rib defines a forward extent of the trailing edge cavity, a plurality of pressure side cavities defined by one or more pressure side skin cavity walls arranged along an interior surface of the pressure side wall, wherein at least one pressure side skin cavity wall does not extend to the suction side wall, a plurality of suction side cavities defined by one or more suction side skin cavity walls arranged along an interior surface of the suction side wall, wherein at least one suction side skin cavity wall does not extend to the pressure side wall, and a main body cavity extending between the leading edge interior rib and the trailing edge interior rib. The plurality of pressure side cavities and the plurality of suction side cavities are arranged in a staggered pattern in a direction from the leading edge to the trailing edge, with the one or more pressure side skin cavity walls, the one or more suction side skin cavity walls, the leading edge interior rib, and the trailing edge interior rib defining the bounds of the main body cavity.

In addition to one or more of the features described above, or as an alternative, further embodiments of the airfoils may include that at least one of (i) a dimension of each pressure side cavity in a direction from the pressure side toward the suction side spans greater than 50% and less than 100% across the airfoil body and (ii) a dimension of each suction side cavity in a direction from the suction side toward the pressure side spans greater than 50% and less than 100% across the airfoil body.

In addition to one or more of the features described above, or as an alternative, further embodiments of the airfoils may include that at least one impingement aperture is formed in the leading edge interior rib and fluidly connects the main body cavity to the leading edge cavity.

In addition to one or more of the features described above, or as an alternative, further embodiments of the airfoils may include a main body cavity rib configured to divide the main body cavity into a first subcavity and a second subcavity, wherein the first subcavity is forward of the second subcavity.

In addition to one or more of the features described above, or as an alternative, further embodiments of the airfoils may include at least one crossover aperture formed in the main body cavity rib and fluidly connecting the first subcavity to the second subcavity.

In addition to one or more of the features described above, or as an alternative, further embodiments of the airfoils may include that the main body cavity rib extends from an apex on one of the one or more pressure side skin cavity walls to the suction side.

In addition to one or more of the features described above, or as an alternative, further embodiments of the airfoils may include that the main body cavity rib extends from an apex on one of the one or more suction side skin cavity walls to the pressure side.

In addition to one or more of the features described above, or as an alternative, further embodiments of the airfoils may include that each of the plurality of pressure side cavities and each of the plurality of suction side cavities are triangular in shape in cross-section.

In addition to one or more of the features described above, or as an alternative, further embodiments of the airfoils may include a plurality of main body cavity ribs configured to divide the main body cavity into a plurality of main body subcavities.

In addition to one or more of the features described above, or as an alternative, further embodiments of the airfoils may include that at least two main body subcavities of the plurality of main body subcavities are fluidly connected by at least one crossover aperture.

In addition to one or more of the features described above, or as an alternative, further embodiments of the airfoils may include that each main body cavity rib extends from an apex on a pressure side skin cavity wall to the suction side wall.

In addition to one or more of the features described above, or as an alternative, further embodiments of the airfoils may include that the main body cavity does not vary in circumferential thickness more than 25% over an axial distance of 0.200 inch along the axial extent of the main body cavity.

According to some embodiments, core assemblies for manufacturing airfoils are provided. The formed airfoils include a leading edge, a trailing edge, a pressure side wall extending between the leading edge and the trailing edge and defining a pressure side, and a suction side wall extending between the leading edge and the trailing edge and defining a suction side, wherein a plurality of cooling passages are formed within the airfoil. The core assemblies include a leading edge cavity core configured to define a leading edge cavity within a formed airfoil body that is defined along a leading edge to provide cooling to the leading edge of the formed airfoil, a trailing edge cavity core configured to define a trailing edge cavity within the formed airfoil body that is defined along a trailing edge to provide cooling to the trailing edge of the formed airfoil, a plurality of pressure side cavity cores configured to define a plurality of pressure side skin cavities arranged along an interior surface of a pressure side wall of the formed airfoil body, wherein at least one formed pressure side skin cavity wall does not extend to a suction side wall of the formed airfoil body, a plurality of suction side cavity cores configured to define a plurality of suction side skin cavities arranged along an interior surface of a suction side wall of the formed airfoil body, wherein at least one formed suction side skin cavity wall does not extend to a pressure side wall of the formed airfoil body, and a main body cavity core positioned axially between the leading edge cavity core and the trailing edge cavity core and circumferentially between the plurality of pressure side cavity cores and the plurality of suction side cavity cores. The plurality of pressure side cavity cores and the plurality of suction side cavity cores are arranged in a staggered pattern in a direction from the leading edge cavity core to the trailing edge cavity core along the main body cavity core.

In addition to one or more of the features described above, or as an alternative, further embodiments of the core assemblies may include that the main body cavity core is separated into at least two main body subcavity cores.

In addition to one or more of the features described above, or as an alternative, further embodiments of the core assemblies may include that the main body cavity core has a tapering thickness in a circumferential direction from a leading edge end of the main body cavity core toward a trailing edge end of the main body cavity core, wherein the tapering thickness decreases smoothly and the trailing edge end has a thickness that is at least 40% a thickness of the leading edge end.

According to some embodiment, gas turbine engines are provided. The gas turbine engines include a turbine section, a compressor section, and an airfoil located in at least one of the turbine section and the compressor section. The airfoil includes an airfoil body having a leading edge, a trailing edge, a pressure side wall extending between the leading edge and the trailing edge and defining a pressure side, and a suction side wall extending between the leading edge and the trailing edge and defining a suction side, wherein a plurality of cooling passages are formed within the airfoil body, a leading edge cavity defined within the airfoil body and defined along the leading edge to provide cooling to the leading edge of the airfoil, wherein a leading edge interior rib defines an aft extent of the leading edge cavity, a trailing edge cavity defined within the airfoil body and defined along the trailing edge to provide cooling to the trailing edge of the airfoil, wherein a trailing edge interior rib defines a forward extent of the trailing edge cavity, a plurality of pressure side cavities defined by one or more pressure side skin cavity walls arranged along an interior surface of the pressure side wall, wherein at least one pressure side skin cavity wall does not extend to the suction side wall, a plurality of suction side cavities defined by one or more suction side skin cavity walls arranged along an interior surface of the suction side wall, wherein at least one suction side skin cavity wall does not extend to the pressure side wall. A main body cavity extends between the leading edge interior rib and the trailing edge interior rib, wherein the plurality of pressure side cavities and the plurality of suction side cavities are arranged in a staggered pattern in a direction from the leading edge to the trailing edge, with the one or more pressure side skin cavity walls, the one or more suction side skin cavity walls, the leading edge interior rib, and the trailing edge interior rib defining the bounds of the main body cavity.

In addition to one or more of the features described above, or as an alternative, further embodiments of the gas turbine engines may include that at least one of a dimension of each pressure side cavity in a direction from the pressure side toward the suction side spans less than 100% across the airfoil body or a dimension of each suction side cavity in a direction from the suction side toward the pressure side spans less than 100% across the airfoil body.

In addition to one or more of the features described above, or as an alternative, further embodiments of the gas turbine engines may include that at least one of the pressure side cavities and the suction side cavities extends in a direction between the suction side and the pressure side for a distance that is at least 50% of a span across the airfoil body.

In addition to one or more of the features described above, or as an alternative, further embodiments of the gas turbine engines may include at least one main body cavity rib configured to divide the main body cavity into at least a first subcavity and a second subcavity, wherein the first subcavity is forward of the second subcavity.

In addition to one or more of the features described above, or as an alternative, further embodiments of the gas turbine engines may include that each of the plurality of pressure side cavities and each of the plurality of suction side cavities are triangular in shape in cross-section.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
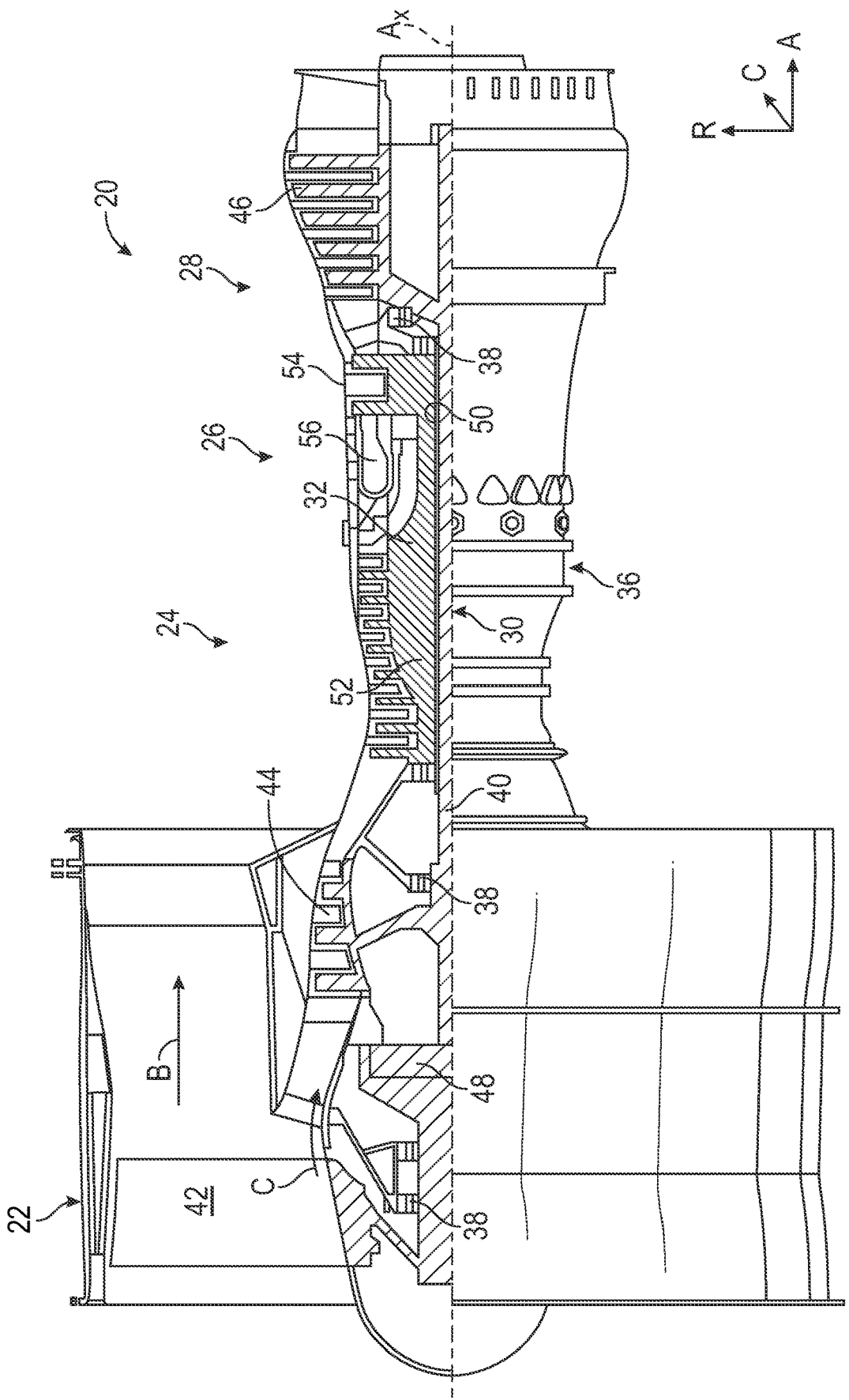
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. With reference to FIG. 1, as used herein, "aft" refers to the direction associated with the tail (e.g., the back end) of an aircraft, or generally, to the direction of exhaust of the gas turbine engine (to the right in FIG. 1). The term "forward" refers to the direction associated with the nose (e.g., the front end) of an aircraft, or generally, to the direction of flight or motion (to the left in FIG. 1). An axial direction A is along an engine central longitudinal axis $A_x$ (left and right on FIG. 1). Further, radially inward refers to a negative radial direction relative to the engine axis $A_x$ and radially outward refers to a positive radial direction (radial being up and down in the cross-section of the page of FIG. 1). A circumferential direction C is a direction relative to the engine axis $A_x$ (e.g., a direction of rotation of components of the engine; in FIG. 1, circumferential is a direction into and out of the page, when offset from the engine axis $A_x$). An A-R-C axis is shown throughout the drawings to illustrate the relative position of various components.

The exemplary engine 20 generally includes a low speed spool 30 and a high speed spool 32 mounted for rotation about the engine central longitudinal axis $A_x$ relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis $A_x$ which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle.

The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, etc.

Figure 2:
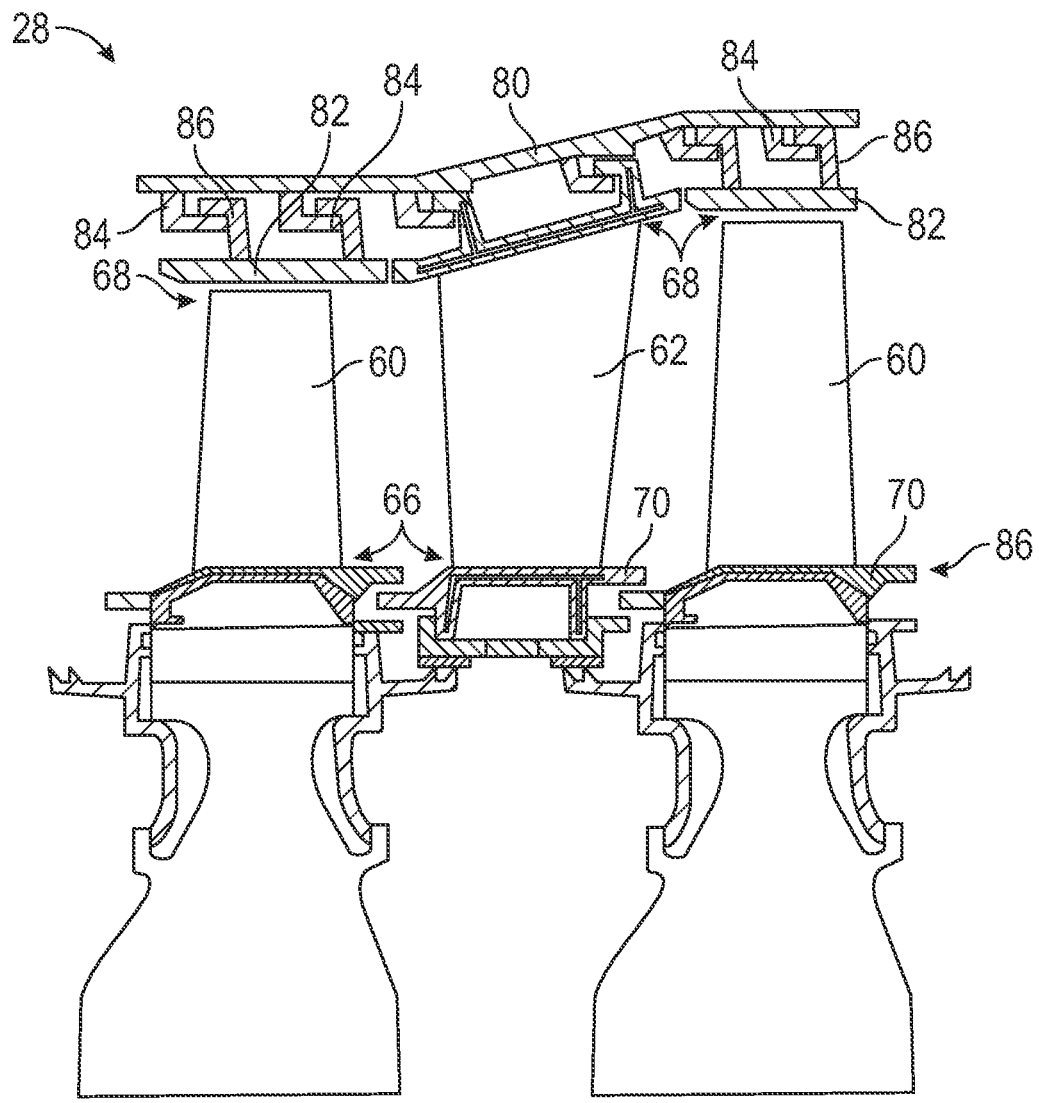
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes. The airfoils 60, 62 may be hollow bodies with internal cavities or cooling passages defining a number of channels, hereinafter airfoil cooling passages, formed therein and extending from an inner diameter 66 to an outer diameter 68, or vice-versa. The airfoil cooling passages may be separated by partitions within the airfoils 60, 62 that may extend either from the inner diameter 66 or the outer diameter 68 of the airfoil 60, 62. In some embodiments, the partitions may extend the entire length of the component. In some embodiments, the partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis $A_x$) may be airflow ports and/or bleed orifices that enable air to bleed from the internal cooling passages of the airfoils 60, 62. A root of the airfoil may connect to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

Figure 3A:
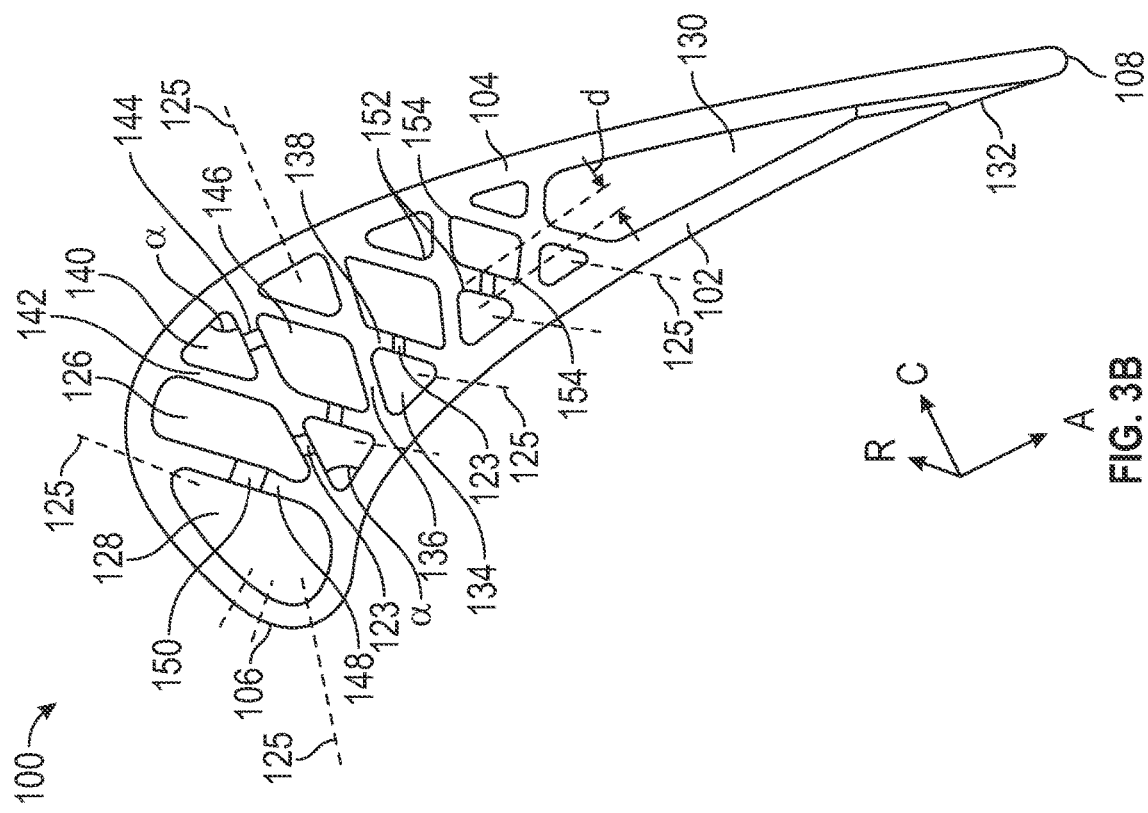
FIG. 3A is a schematic illustration of an airfoil having internal cooling passages.
Figure 3B:
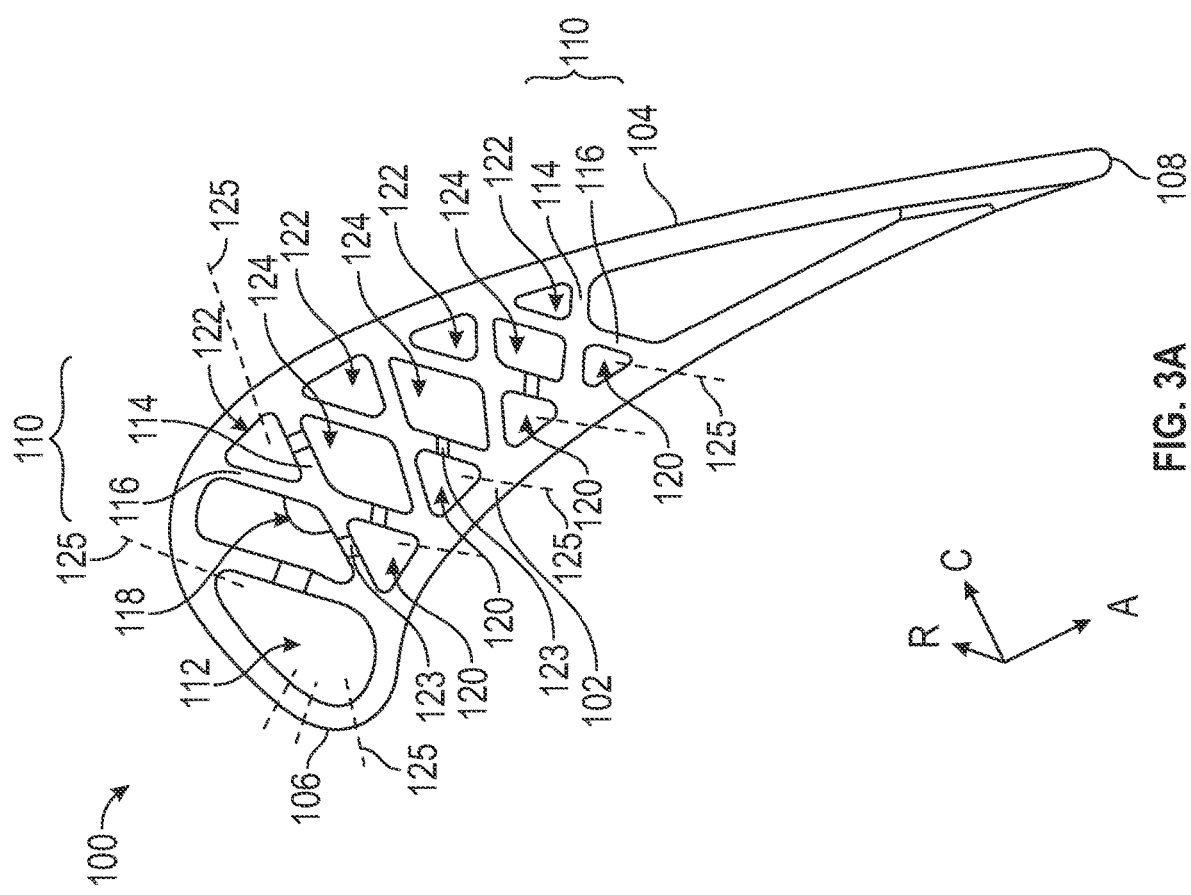
FIG. 3B is an alternatively labeled version of the airfoil of FIG. 3A.

Referring now to FIGS. 3A-3B, an airfoil 100 illustrated to described concepts in accordance with the present disclosure is shown. The airfoil 100 may be a blade employed in a turbine or compressor section of a gas turbine engine. The airfoil 100 has a pressure side exterior wall 102 and a suction side exterior wall 104. The pressure side exterior wall 102 may receive a hot airflow from a combustor section of the gas turbine engine. In that regard, the pressure side exterior wall 102 may be exposed to greater pressure than the suction side exterior wall 104 during operation of the gas turbine engine. The hot airflow may cause the airfoil 100 to rotate about the engine axis $A_x$, as will be appreciated by those of skill in the art. The airfoil 100 includes a leading edge 106 and a trailing edge 108. The leading edge 106 may be located axially forward of the trailing edge 108 and may receive the hot airflow prior to the trailing edge 108.

The airfoil 100, as shown, includes interior ribs 110 that define multiple air passages 112 therebetween. Further, at least one of the air passages 112 may also be defined by the pressure side exterior wall 102 and/or the suction side exterior wall 104, as illustratively shown. The interior ribs 110 may be arranged into sets of ribs, with a set of first interior ribs 114 oriented in a first direction and a set of second interior ribs 116 oriented in a second direction that may differ from the first direction. The interior ribs 110 may define multiple air passages 112 within the airfoil 100. The multiple air passages 112 may receive a cooling airflow to reduce a temperature of the airfoil 100.

Each of the interior ribs of the set of first interior ribs 114 may be oriented at an angle 118 relative to the each of the ribs of the set of second interior ribs 116. In some example embodiments, the angle 118 may be between 30° and 150°. In some embodiments, each of the interior ribs 110 may contact at least one of the pressure side exterior wall 102 or the suction side exterior wall 104 and the interior ribs 110 may not extend all the way to the opposing pressure side or suction side exterior wall 102, 104. As such, in some embodiments, the interior ribs 110 may create triangular passages adjacent to only one of the pressure side exterior wall 102 or suction side exterior wall 104. In some embodiments, each of the interior ribs 110 may extend from the pressure side exterior wall 102 to the suction side exterior wall 104. In that regard, the interior ribs 110 may form a modified truss structure that defines the multiple air passages 112 (as illustratively shown in FIG. 3A) including a first plurality of skin core cavities 120 (e.g., triangular shaped side air passages along the pressure side), a second plurality of skin core cavities 122 (e.g., triangular shaped side air passages along the suction side), and a plurality of internal air passages 124.

In some embodiments and as shown in FIG. 3A, the internal air passages 124 are diamond shaped. As used herein, the term "skin core cavities" or "skin core cavity" refers to air passages or cavities that are defined by a single exterior hot wall (e.g., exposed to a hot gas path when in use) and one or more interior cold walls (e.g., not exposed to exterior surfaces of the airfoil). Stated another way, the skin core cavities are not exposed to multiple different exterior hot walls of the airfoil body. The skin core cavities may have any shape. In the illustrative embodiments, these skin core cavities are primarily triangular in cross-section. However, other shapes may be employed without departing from the scope of the present disclosure.

Some of the interior ribs 110 may be arranged to form one or more leading edge cooling passages including a leading edge feed cooling passage 126 and a leading edge cooling passage 128, as shown in FIG. 3B. The interior ribs 110 may further form one or more trailing edge cooling passages including a trailing edge cooling passage 130, as shown in FIG. 3B. Although shown and described with respect to triangular cross-sectional shaped skin core cavities and diamond shaped internal air passages, those of skill in the art will appreciate that such shapes are not to be limiting, and in some embodiments, other cross-sectional shapes may be employed. For example, and without limitation, circular, elliptical, half-elliptical, trapezoidal, etc., shaped side and/or internal air passages may be formed, without departing from the scope of the present disclosure.

In some embodiments, interior ribs of the first set of interior ribs 114 and the ribs of the second set of interior ribs 116 are oriented such that the angle 118 that is formed between the respective ribs may vary between 30° and 150°. Interior ribs of each set of interior ribs 114, 116 intersect and bisect the airfoil 100 at a location that is approximate the mean camber line, located between the airfoil pressure side exterior wall 102 and suction side exterior wall 104. The interior ribs 110 have partial rib segments (of the sets of ribs 114, 116 which generally fully extend between the pressure side exterior wall 102 and suction side exterior wall 104) that partially extend to a location approximate the mean camber line.

The multiple air passages 112 may be oriented in such a way as to segregate the cooling flows into different regions. For example, the first plurality of skin core cavities 120 may transport a pressure side cooling airflow, and the second plurality of skin core cavities 122 may transport a suction side cooling airflow. The internal air passages 124 may function as tip feed passages to transport cooling air to an inner diameter or an exterior diameter extent of the airfoil 100 (e.g., to the tip). Because the internal air passages 124 are bordered by the interior ribs 110 only, instead of the pressure side exterior wall 102 or the suction side exterior wall 104, the cooling airflow traveling through the internal air passages 124 remains relatively cool. In that regard, the internal air passages 124 may provide relatively cool air to the inner diameter or the exterior diameter extent of the airfoil 100.

In some embodiments, and as shown, the internal passage may be used to provide resupply cooling air flow, through one or more resupply flow apertures 123, to either, or at least one of the first plurality of skin core cavities 120 and/or at least one of the second plurality of skin core cavities 122. The resupply flow apertures 123, as shown, emanate from the internal air passages 124 and provide a fluidic connection through which relatively higher pressure and lower temperature cooling air may be provided to the respective first and second plurality of skin core cavities 120, 122. The resupply of higher pressure, colder cooling air from the internal air passages 124 may be required to mitigate internal flow separation that may occur in the skin core cavities 120, 122 due to Coriolis forces that occur in rotating air passages. In addition to mitigating adverse internal convective heat transfer consequences related to rotating passages, the resupply flow apertures 123 emanating from the internal air passages 124 may also be necessary to mitigate excessive cooling air heat pickup and/or high pressure losses that may be incurred in respective skin core cavities 120, 122.

It will be appreciated by those of skill in the art that the location of the resupply flow apertures 123 shown in the illustrative figures are for illustrative purposes and are not limiting in any way. That is, any combination, orientation, and selection of connected passages by use of resupply flow apertures may be used and/or optimized based on the local external heat flux, cooling flow, pressure loss, and cooling air temperature heat pickup in order achieve local and overall component thermal cooling effectiveness and durability life requirements, without departing from the scope of the present disclosure.

Further, in some embodiments and as shown, film cooling hole apertures 125 may be formed to emanate from any of the internal cooling passages 112, 120, 122 to expel air to an exterior of the airfoil 100. In some such configurations, it may be necessary to incorporate the resupply flow apertures 123, fed from the internal air passages 124 to respective skin core cavities 120, 122 to ensure adequate pressure ratio and back flow margin is maintained across the film cooling hole apertures 125 in order to achieve local film cooling effectiveness and thermal cooling performance requirements.

The leading edge feed cooling passage 126 and the leading edge cooling passage 128 may be configured to transport a leading edge cooling airflow. In some configurations, an airflow from the leading edge feed cooling passage 126 into the leading edge cooling passage 128 may be an impinging flow. Further, one or more film cooling hole apertures 125 may be located on the leading edge 106 such that a film layer may be formed on the exterior surface of the airfoil 100, as will be appreciated by those of skill in the art. The trailing edge cooling passage 130 may be arranged to transport a trailing edge cooling airflow. The trailing edge cooling airflow may exit the airfoil 100 through one or more trailing edge cooling exits 132, such as holes, slots, etc., as will be appreciated by those of skill in the art.

With respect to the interior cavities (i.e., between the leading edge 126, 128 and trailing edge 130 cavities) are the geometric shaped first plurality of skin core cavities 120, the second plurality of skin core cavities 122, and the plurality of internal air passages 124. The first plurality of skin core cavities 120 may each be bordered by a combination of one or more of the interior ribs 110 and the pressure side exterior wall 102. For example, the first plurality of skin core cavities 120 may include a first skin core cavity 134. The first skin core cavity 134 may have a first wall that is defined by a first interior rib 136, a second wall that is defined by a second interior rib 138, and a third wall that is defined by the pressure side exterior wall 102.

Similarly, the second plurality of skin core cavities 122 may each be bordered by a combination of one or more of the interior ribs 110 and the suction side exterior wall 104. For example, the second plurality of skin core cavities 122 may include a second skin core cavity 140. The second skin core cavity 140 may have a first wall that is defined by a third rib 142, a second wall that is defined by a fourth rib 144, and a third wall that is defined by the suction side exterior wall 104.

The internal air passages 124 may be bordered entirely by three or more ribs of the interior ribs 110. For example, the internal air passages 124 may include a first internal air passage 146 that is bordered entirely by interior ribs 110. In this illustrative embodiment and configuration, the first internal air passage 146 has four sides, each side defined by a portion of the first interior rib 136, the second interior rib 138, the third rib 142, and the fourth rib 144.

One or more of the interior ribs 110 may define openings between adjacent air passages 112. For example, shown proximate the leading edge 106, an interior rib 148 may define a cooling flow aperture opening 150 between the leading edge feed cooling passage 126 and the leading edge cooling passage 128. The cooling flow aperture opening 150 may allow air to transfer between the leading edge feed cooling passage 126 and the leading edge cooling passage 128, as described above. The cooling flow aperture opening 150 may be one or more (e.g., an array) of impingement holes between the leading edge feed cooling passage 126 and the leading edge cooling passage 128. Likewise, one or more of the internal air passages 112 defined by the interior ribs 110 may include cooling holes, bleed holes, transfer holes, impingement holes, etc.

For example, the pressure side exterior wall 102 may include the trailing edge cooling exits 132 designed to facilitate movement of the cooling airflow from the trailing edge cooling passage 130 to the pressure side exterior wall 102 in order to cool the pressure side exterior wall 102. Additional holes or apertures may be arranged in or through one or more of the interior ribs 110 and/or on the pressure side 102 or the suction side 104 of the airfoil to provide a desired cooling scheme, as will be appreciated by those of skill in the art. Further, in some embodiments, the internal cooling passages (those not at the leading or trailing edge) may each be fluidly separated or separate from each of the other internal cooling passages.

In order to achieve the target oxidation and thermal mechanical fatigue lives in modern engines with high gas-path temperatures and low cooling flow allotments, a cooling scheme is needed that utilizes the cooling air effectively to meet the oxidation lives and still provide the flexibility that the airfoils need to meet the thermal mechanical fatigue lives. Some airfoils are configured to provide sufficient heat transfer on both the pressure and suction side exterior walls of a blade by utilizing a cold internal wall that is parallel to the exterior wall(s) and ribs that are perpendicular to the exterior wall (e.g., circumferentially extending ribs).

A disadvantage of this type of geometric arrangement is the high compressive strains that are induced in the hot exterior wall due to the relatively large differential in absolute operating metal temperature that exists between the cold internal wall and the hot exterior wall. The metal temperature difference between the cold internal wall and the hot exterior wall adversely impacts the relative rate of thermal expansion. In this sense, the stiff cold internal wall thereby constrains the expansion of the hot exterior wall, increasing both compressive stresses and strains. Such high compressive strains reduce the thermal mechanical fatigue capability of the hot exterior wall, resulting in premature crack initiation and accelerated crack propagation.

To address this, a truss-configuration, for example as shown and described above, provides for increases to the thermal mechanical fatigue life by replacing the cold parallel internal wall and perpendicular ribs that cause the high compressive strains with ribs that intersect in an x-shape or truss arrangement. Such blades are also shown and described in U.S. Pat. No. 10,378,364, entitled "Modified structural truss for airfoils," granted Aug. 13, 2019, which is incorporated by reference in its entirety. The x-shape arrangement of the ribs can provide for a flexible or compliant structure that allows the exterior walls of the airfoil to expand without incurring significant compressive load stresses and strains due to the constrains associated with cold internal walls.

For example, with continued reference to FIGS. 3A-3B, a flexible or compliant structure of an airfoil is shown. As used herein, the terms flexible or compliant, as used with respect to an airfoil structure, refers to an airfoil structure that allows the aspect ratio of the airfoil structure and of the internal passages to change as a thermal load is applied. As shown in FIG. 3B, an angle $\alpha$ is formed or defined between the internal rib 144 and the pressure side 102 and the suction side wall 104. Such angle $\alpha$ may be substantially the same for each internal rib of the airfoil 100. In some embodiments, the angle $\alpha$ is less than 90°, and thus angled ribs are provided. Such angled ribs will form the triangular shaped internal cavities. In some embodiments, the angle $\alpha$ may be less than 75°, allowing the airfoil and internal passages to collapse or compress in the circumferential direction (e.g., inward from the external hot walls) as the hot outer walls expand in the axial direction.

In some embodiments, both the forward angle and the aft angle along a hot wall of a skin core cavity 120, 122 may be the same angle at the intersection with the exterior hot wall. It will be appreciated that the angles of the forward and aft corners of the skin core cavities 120, 122 may be different due to the curvature of the external wall, and thus the angles may be similar but not exactly the same. Further, it will be appreciated that although the pressure side and suction side may have similar angles, due to the curvature of the external hot walls, the actual angle between an internal rib and an exterior hot wall may be different between the pressure side and the suction side.

Further, as shown, a circumferential distance d is defined between an apex 152 of the skin core cavities 120, 122 and an apex 154 of the internal air passages 124. This circumferential distance d can aid in the flexibility of the structure of the airfoil 100, with larger circumferential distances d being more flexible than smaller circumferential distances d. As a result, in accordance with some embodiments of the present disclosure, the size of the internal air passages 124 may have a circumferential dimension that is large enough such that there is overlap in such circumferential direction between the internal air passages 124 and adjacent skin core cavities 120, 122.

As such, the flexible or compliant structure of the airfoil experiences shrinking of the airfoil in the circumferential direction while elongating in the axial direction. Though the change in aspect ratio may be slight, such change may be enough to allow for the free expansion of the hot outer walls, thereby reducing thermal stresses. The airfoil interior cooling cavity schemes of internal cavities is provided through segregated main body cavities and an unprotected leading edge feed cavity. Some prior art configurations have proposed tying the main body cavities together with ceramic core ties or crossover holes for producibility and increased flow area. However, the thermal fight during the casting process between large main bodies, relatively speaking, and small core ties can result in high stresses in the core ties. Abrupt changes in core thickness (mass) can create high thermal stresses due to the different heat absorption rates of the various thicknesses (mass). Large thickness masses will take a relatively longer time to heat up and cool down than small, thin masses. It may be preferable in the casting process to have cores with a more uniform thickness to minimize thermal stresses (i.e., few or no abrupt changes in thickness).

In view of this, airfoils in accordance with the present disclosure are configured to maintain the flexibility of the concepts described above while achieving main body cores that are more uniform in thickness. This may be achieved, in accordance with embodiments of the present disclosure, by staggering the pressure side skin core passages with the suction side skin core passages. This staggered skin core passage configuration allows for an axially longer and continuous/connected main body cavity (e.g., internal air passage).

Figure 4:
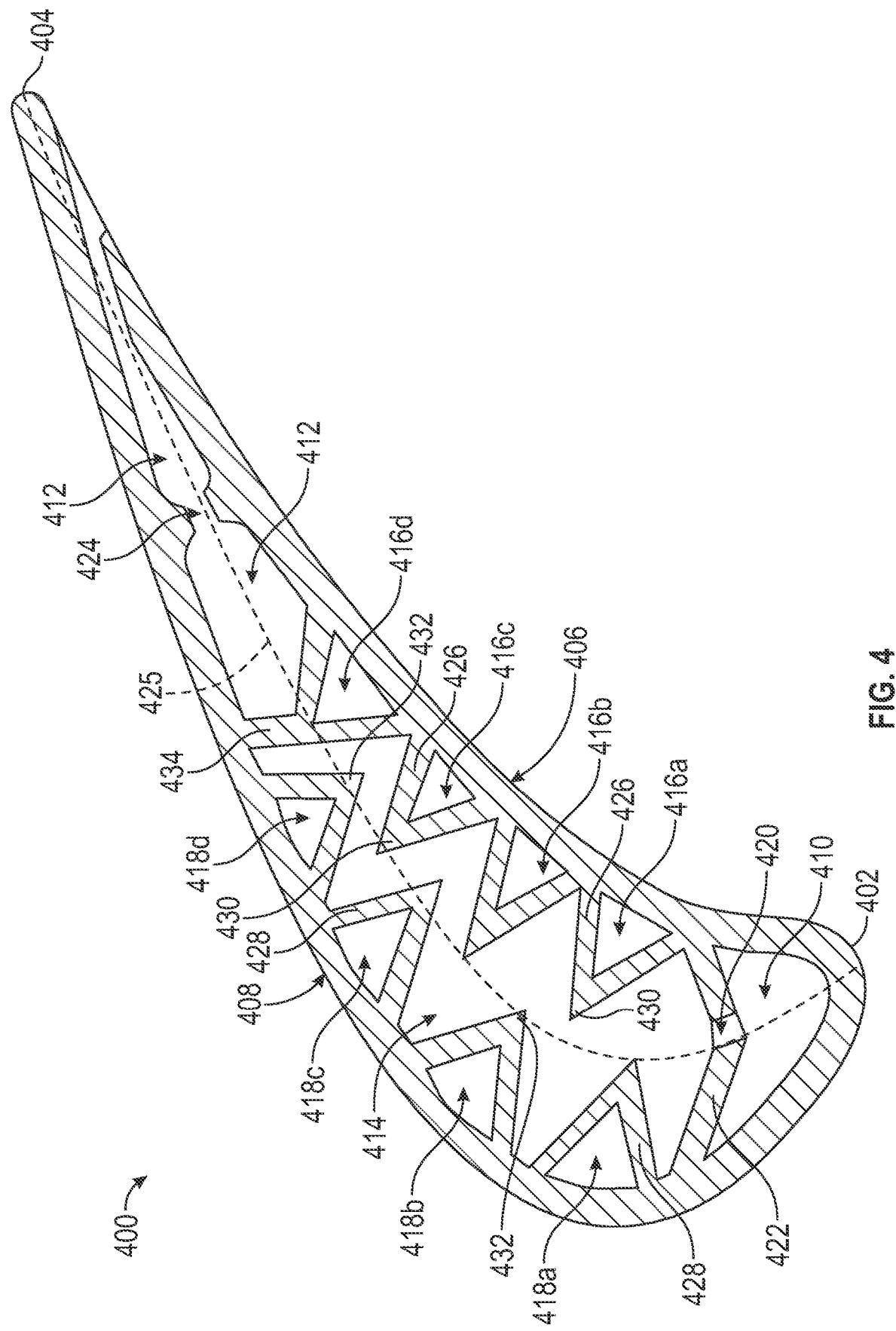
FIG. 4 is a schematic illustration of an airfoil in accordance with an embodiment of the present disclosure.

Turning now to FIG. 4, a schematic illustration of an airfoil 400 in accordance with an embodiment of the present disclosure is shown. The airfoil 400 has a leading edge 402 and a trailing edge 404 with a pressure side wall 406 and a suction side wall 408 extending between the leading edge 402 and the trailing edge 404. The interior of the airfoil 400 includes a plurality of interior walls or ribs that are arranged to define a plurality of interior cavities or passages that are arranged to provide cooling to the airfoil 400.

In this illustrative embodiment, the interior cavities includes a leading edge cavity 410, a trailing edge cavity 412, a main body cavity 414, a plurality of pressure side cavities 416a-d, and a plurality of suction side cavities 418a-d. The leading edge cavity 410 may be supplied with impingement cooling from the main body cavity 414 through one or more impingement apertures 420 that are arranged in a leading edge interior rib 422. The trailing edge cavity 412 may be formed as a single cavity, or as shown, from one or more subcavities that may be fluidly connected by crossover apertures 424 or the like.

The plurality of pressure side cavities 416a-d and suction side cavities 418a-d are arranged in an alternating or staggered pattern in an axial direction. That is, in a direction along a mean camber line 425 that is defined as an imaginary line which lies halfway between the pressure side wall 406 and suction side wall 408 of the airfoil 400 and intersects a chord line at the leading edge 402 and the trailing edge 404. The staggering or alternating pattern is defined by the location of the innermost portion of the respective side cavities 416a-d, 418a-d. The pressure side cavities 416a-d are each defined within or by pressure side skin cavity walls 426 and the suction side cavities 418a-d are each defined within or by suction side skin cavity walls 428. In this embodiment, each respective side skin cavity wall 426, 428 extends inward from the respective side wall 406, 408 toward the mean camber line 426 and then at a respective inflection point 430, 432 the respective side skin cavity wall 426, 428 extends back to the same side wall 406, 408. As such, each of the side cavities 416a-d, 418a-d may be referred to as a skin core cavity, with a hot exterior wall (e.g., side walls 406, 408) and a cold interior wall (e.g., side skin cavity walls 426, 428). The side skin cavity walls 426, 428 may be ribs or rib segments, such as described above with respect to FIGS. 3A-3B (e.g., structurally similar to ribs 110 and/or rib segments 114, 116).

In this embodiment, the side skin cavity walls 426, 428 that define the side cavities 416a-d, 418a-d do not extend a full span from the pressure side 406 to the suction side 408, and thus the main body cavity 414 has a more uniform thickness in dimension between the pressure side 406 and the suction side 408 along the axial extent thereof as compared to conventional main body cavities (e.g., in direction from leading edge 402 to trailing edge 404 along the mean camber line 425). As used herein, the term "more uniform" refers to the changes in thickness of the main body cavity and that there are no or limited abrupt changes in thickness. In accordance with some embodiments, a gradual or continuous tapering (decreasing) in thickness main body cavity may be preferred. The more uniform thickness of the main body cavity 414 causes less thermal stress during a casting process of the airfoil 400, thereby improving yields and resulting in less core break. Further, the staggered side cavities 416a-d, 418a-d allow for the main body cavity 414 to be protected from external heat load, resulting in less heat up of cooling air within the main body cavity 414 and reduced pressure drop as flow moves around the main body cavity 414, as compared to other airfoil cooling cavity arrangements.

As described herein, the main body cavity 414 has a more uniform thickness than convention main body cavities. As used herein, the more uniform thickness of the main body cavity means that a minimum thickness of the main body cavity may be greater than 40% of a maximum thickness and there are no abrupt changes in thickness or width of the main body cavity between a largest dimension and a smallest dimension along the axial length of the main body cavity. In the embodiment of FIG. 4, the minimum thickness occurring at the trailing edge end of the main body cavity 414 near the peak of the aft-most pressure side cavity 416d is 40% of the maximum thickness occurring at the leading edge end of the main body cavity near the location of a peak of a forward most pressure side cavity 416a, and the transition from the largest dimension to the smallest dimension is substantially smooth, such that there are no abrupt changes in dimension (e.g., a substantially continuous tapering or narrowing from the leading edge end to the trailing edge end of the main body cavity).

In this non-limiting, illustrative embodiment, a first suction side cavity 418a is arranged axially closest to the leading edge cavity 410 and provides shielding to a forward end of the main body cavity 414. Aftward along the mean camber line 425, a first pressure side cavity 416a is arranged on the pressure side wall 406. A second suction side cavity 418b is arranged aft of the first pressure side cavity 416a along the mean camber line 425 and on the suction side wall 416 of the airfoil 400. A second pressure side cavity 416b is arranged aft of the second suction side cavity 418b on the suction side wall 406 along the mean camber line 425. The second pressure side cavity 416b is followed by a third suction side cavity 418c, then a third pressure side cavity 416c, then a fourth suction side cavity 418d, and then a fourth pressure side cavity 416d. Although shown with four pressure side cavities 416a-d and four suction side cavities 418a-d, those of skill in the art will appreciate that a greater or lesser number of either or both of the pressure side cavities and suction side cavities may be employed without departing from the scope of the present disclosure.

The side skin cavity walls 426, 428 are full span in the radial direction of the airfoil 400. That is, the side cavities 416a-d, 418a-d are cavities that extend radially from a root of the airfoil 400 to a tip thereof. Similarly, the leading edge cavity 410, the main body cavity 414, and the trailing edge cavity 412 may extend radially from the root to tip. The cavities 410, 412, 414, 416a-d, 418a-d of the airfoil 400 may be fed with cooling air from a root area of the airfoil 400 with the cooling air passed radially outward from the root toward the tip. The cooling air may be expelled from the cavities 410, 412, 414, 416a-d, 418a-d through known means, such as impingement apertures, film cooling holes, showerhead cooling holes, crossover holes (e.g., connecting one cavity to another), trailing edge slots, and the like, as will be appreciated by those of skill in the art.

Although the side cavities 416a-d, 418a-d are illustratively shown as substantially triangular in shape, such geometry is not intended to be limiting. For example, in some embodiments, the side cavities of some embodiments of the present disclosure may be substantially trapezoidal in shape, rounded in shape (e.g., partial circle or partial oval), squared in shape, etc.

The staggered side cavities 416a-d, 418a-d define a continuous main body cavity 414 that extends axially (e.g., in the general direction from the leading edge 402 to the trailing edge 404 along the mean camber line 425) along the section of the airfoil 400 that includes the side cavities 416a-d, 418a-d. Stated another way, the main body cavity 414 extends from the leading edge interior rib 422 at a forward end to a trailing edge interior rib 434. The trailing edge interior rib 434 defines a forward end of the trailing edge cavity 412. As such, the main body cavity 414 defines a continuous interior cavity or interior space of the airfoil 400 that is substantially protected from external heat pickup by the side cavities 416a-d, 418a-d. The side cavities 416a-d, 418a-d, configured as skin cavities, provide thermal protection to the bulk or majority of the main body cavity 414 allowing for the cooling air within the main body cavity 414 to have relatively low heat pickup from the exterior side walls 406, 408.

Figure 5:
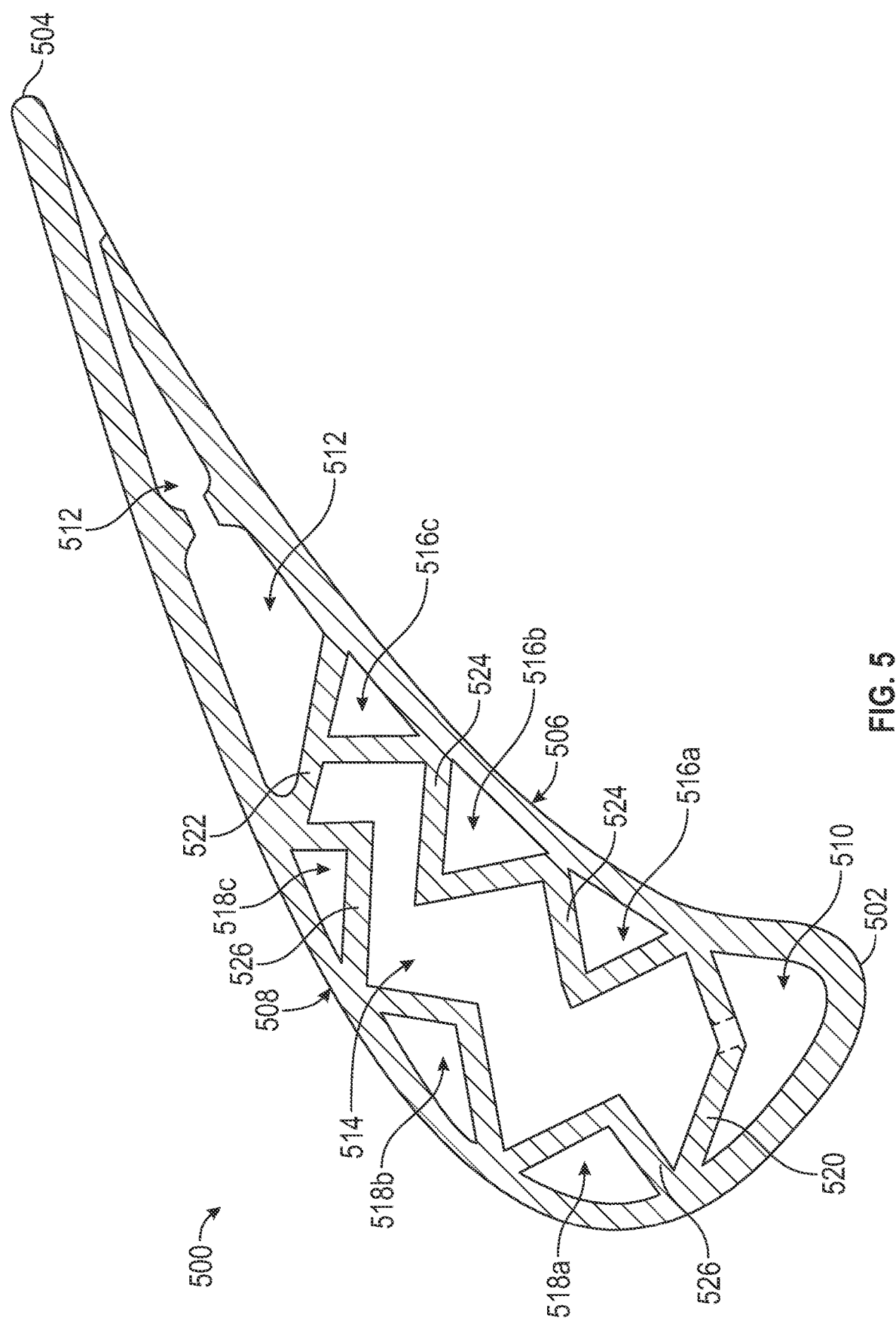
FIG. 5 is a schematic illustration of an airfoil in accordance with an embodiment of the present disclosure.

Turning now to FIG. 5, an airfoil 500 in accordance with an embodiment of the present disclosure is shown. The airfoil 500 has a similar configuration as that shown and described above with respect to FIG. 4. The airfoil 500 has a leading edge 502, a trailing edge 504, a pressure side wall 506, a suction side wall 508, and a plurality of interior cooling cavities or passages. As shown, the airfoil 500 includes a leading edge cavity 510, a trailing edge cavity 512, and a main body cavity 514. A number of pressure side cavities 516a-c and a number of suction side cavities 518a-c are arranged along the exterior side walls 506, 508 and provide thermal protection and definition to the main body cavity 514.

Similar to the embodiment of FIG. 4, the main body cavity 514 extends from a leading edge interior rib 520 at a forward end to a trailing edge interior rib 522 at an aft end. Each of the side cavities 516a-c, 518a-c are defined by respective pressure side skin cavity walls 524 and suction side skin cavity walls 526. In this embodiment, there are fewer side cavities as compared to the embodiment of FIG. 4. However, the side cavities 516a-c, 518a-c provide the same thermal protection to the main body cavity 514. To achieve this protection, the lesser number of side cavities 516a-c, 518a-c are arranged having a larger or longer axial extent along the respective side walls 506, 508. In a similar sized airfoil, the total axial span of the side cavities 516a-c, 518a-c along the respective side walls 506, 508 is equal to the total axial span of the side cavities 416a-d, 418a-d. As a result, the exterior hot wall portion of each of the individual side cavities 516a-c, 518a-c is greater than that of each of the individual side cavities 416a-d, 418a-d of the embodiment of FIG. 4. In accordance with embodiments of the present disclosure, as will be appreciated by the teachings herein, the side cavities are arranged to protect the interior main body cavity to minimize or eliminate external hot wall heat pickup within the main body cavity, regardless of the number and shape of the side cavities.

Similar to the embodiment of FIG. 4, the pressure side skin cavity walls 524 and suction side skin cavity walls 526 are configured to extend from a respective pressure side wall 506 and suction side wall 508 toward the opposite suction side wall 508 and pressure side wall 506, respectively. In the present embodiment, the majority of the pressure side skin cavity walls 524 and suction side skin cavity walls 526 do not contact other features and return back to the same side wall 506, 508. As a result, the main body cavity 514 has a relatively uniform tapering in a pressure side-to-suction side dimension. In some embodiments, the pressure side skin cavity walls 524 and suction side skin cavity walls 526, in this embodiment, extend to at most 50% of the span from the pressure side wall 506 to the suction side wall 508 or from the suction side wall 508 to the pressure side wall 506, respectively. In other embodiments, the extent of the pressure and/or suction side cavity walls may extend for distances that are less than 100% across the airfoil body. Further, in some embodiments, the extent may be between 50% and 100%, exclusive.

Figure 6:
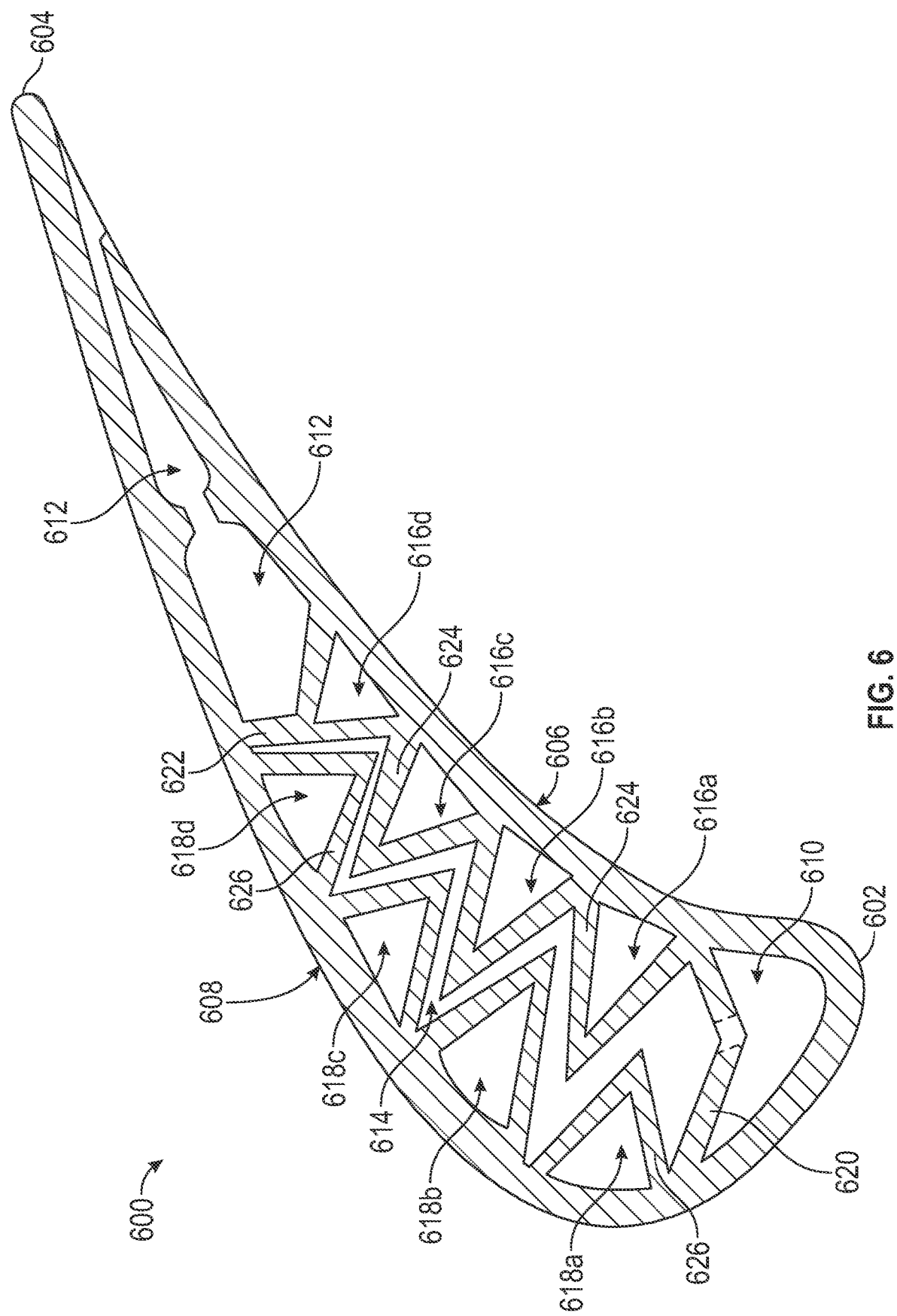
FIG. 6 is a schematic illustration of an airfoil in accordance with an embodiment of the present disclosure.

Turning now to FIG. 6, an airfoil 600 in accordance with an embodiment of the present disclosure is shown. The airfoil 600 has a similar configuration as that shown and described above with respect to FIGS. 4-5. The airfoil 600 has a leading edge 602, a trailing edge 604, a pressure side wall 606, a suction side wall 608, and a plurality of interior cooling cavities or passages. As shown, the airfoil 600 includes a leading edge cavity 610, a trailing edge cavity 612, and a main body cavity 614. A number of pressure side cavities 616a-d and a number of suction side cavities 618a-d are arranged along the exterior side walls 606, 608 and provide thermal protection and definition to the main body cavity 614.

In this embodiment, there are four each of the pressure side cavities 616a-d and the suction side cavities 618a-d. In this embodiment, the main body cavity 614 extends from a leading edge interior rib 620 at a forward end to a trailing edge interior rib 622 at an aft end. Each of the side cavities 616a-d, 618a-d are defined by respective pressure side skin cavity walls 624 and suction side skin cavity walls 626. In contrast to the embodiment of FIG. 4, the pressure side skin cavity walls 624 and suction side skin cavity walls 626, in this embodiment, extend greater than 50% (but less than 100%) of the span from the pressure side wall 606 to the suction side wall 608 or from the suction side wall 608 to the pressure side wall 606, respectively. In other words, the circumferential height of the side cavities 616a-d, 618a-d is greater than that of the earlier described embodiment. However, even with such taller/larger side skin cavities 616a-d, 618a-d, the main body cavity 614 still has a more uniform width or dimension in a direction between the pressure side wall 606 and the suction side wall 608.

Figure 7:
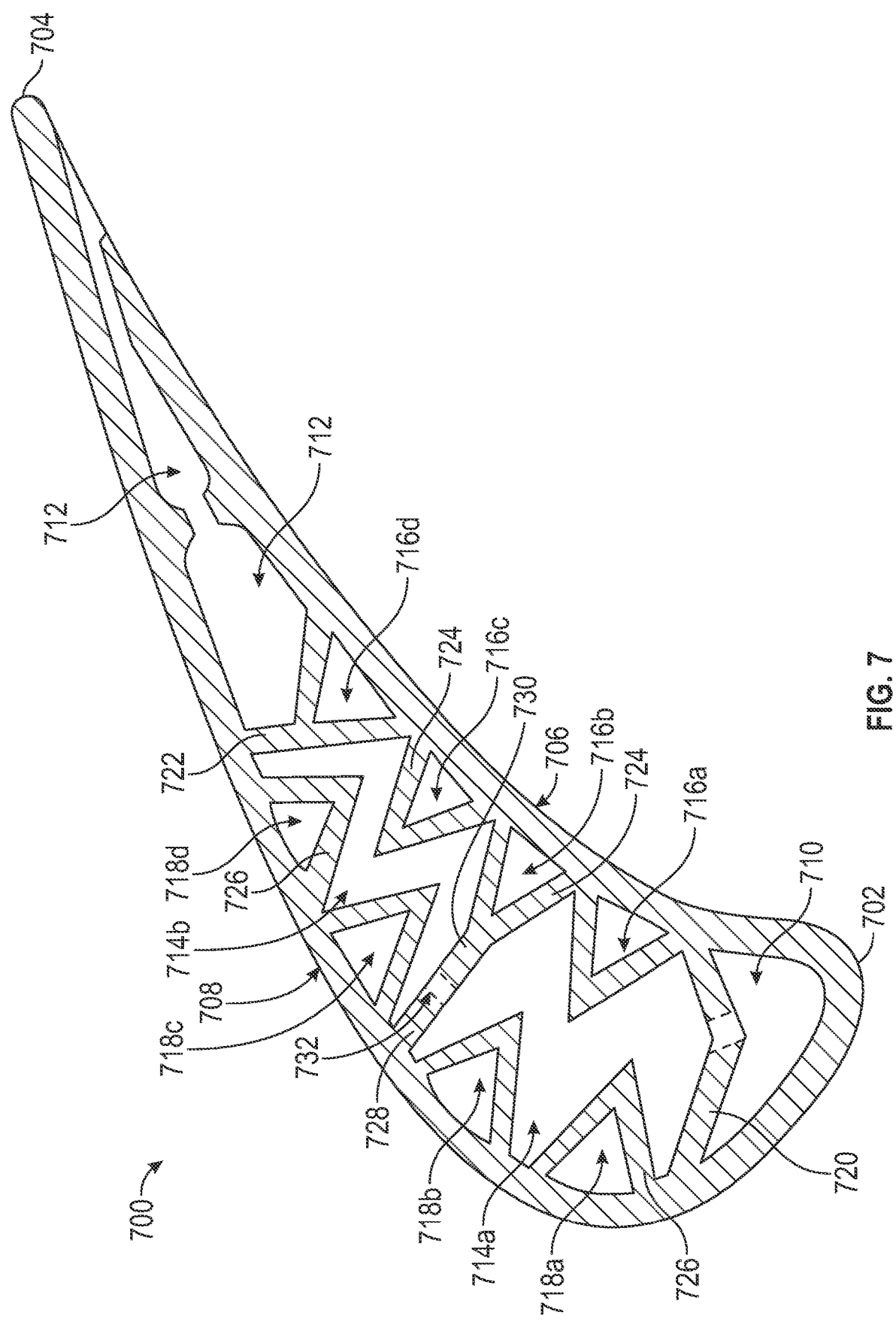
FIG. 7 is a schematic illustration of an airfoil in accordance with an embodiment of the present disclosure.

Turning now to FIG. 7, an airfoil 700 in accordance with an embodiment of the present disclosure is shown. The airfoil 700 has a similar configuration as that shown and described above with respect to FIGS. 4-6. The airfoil 700 has a leading edge 702, a trailing edge 704, a pressure side wall 706, a suction side wall 708, and a plurality of interior cooling cavities or passages. As shown, the airfoil 700 includes a leading edge cavity 710, a trailing edge cavity 712, and a main body cavity that is separated into a first main body subcavity 714a and a second main body subcavity 714b. A number of pressure side cavities 716a-d and a number of suction side cavities 718a-d are arranged along the exterior side walls 706, 708 and provide thermal protection and definition to the main body subcavities 714a-b. The pressure side cavities 716a-d are defined by respective pressure side skin cavity walls 724 and the suction side cavities 718a-d are defined by respective suction side skin cavity walls 726. Similar to the above described embodiment, the majority of the side skin cavity walls 724, 726 do not span the airfoil 700 from the pressure side wall 706 to the suction side wall 708, but rather return to the same side wall 706, 708. The main body subcavities 714a, 714b define an axially extending internal cavity that extends from a leading edge interior rib 720 at a forward end to a trailing edge interior rib 722 at an aft end.

In this embodiment, a pressure side skin cavity wall 724 that defines a second pressure side cavity 716b is connected to the suction side wall 708 by a main body cavity rib 728. The main body cavity rib 728 extends from an apex or inflection point 730 of the pressure side skin cavity wall 724 that defines the second pressure side cavity 716b to the opposing suction side wall 708. The main body cavity rib 728 can be provided to increase stability of the airfoil 700 and prevent bulge during operation. As shown, and present in some embodiments, the main body cavity rib 728 may include one or more crossover apertures 732 that fluidly connect the first main body cavity 714a with the second main body cavity 714b. In some such embodiments, during manufacture and assembly, the fluid connection may be achieved by separately manufacturing cores that are assembled together to prevent core break issues associated with abrupt changes in core thickness. Alternatively, in some embodiments, the two main body cavities 714a, 714b may be fluidly separate with no fluid communication through the main body cavity rib 728. Even with the main body cavity rib 728, the pressure side cavities 716a-d and the suction side cavities 718a-d are arranged in an alternating or staggered pattern. This staggering allows for each of the main body cavities 714a, 714b to have a more uniform thickness that minimizes core breakage during a casting process as well as minimizing pressure loss during engine operation. Moreover, this staggering allows for the main body cavity rib 728 to extend from the inflection point 730 to the opposing suction side wall 708. The forward or first main body cavity 714a may be fluidly connected to the leading edge cavity 710 by one or more impingement apertures.

Figure 8:
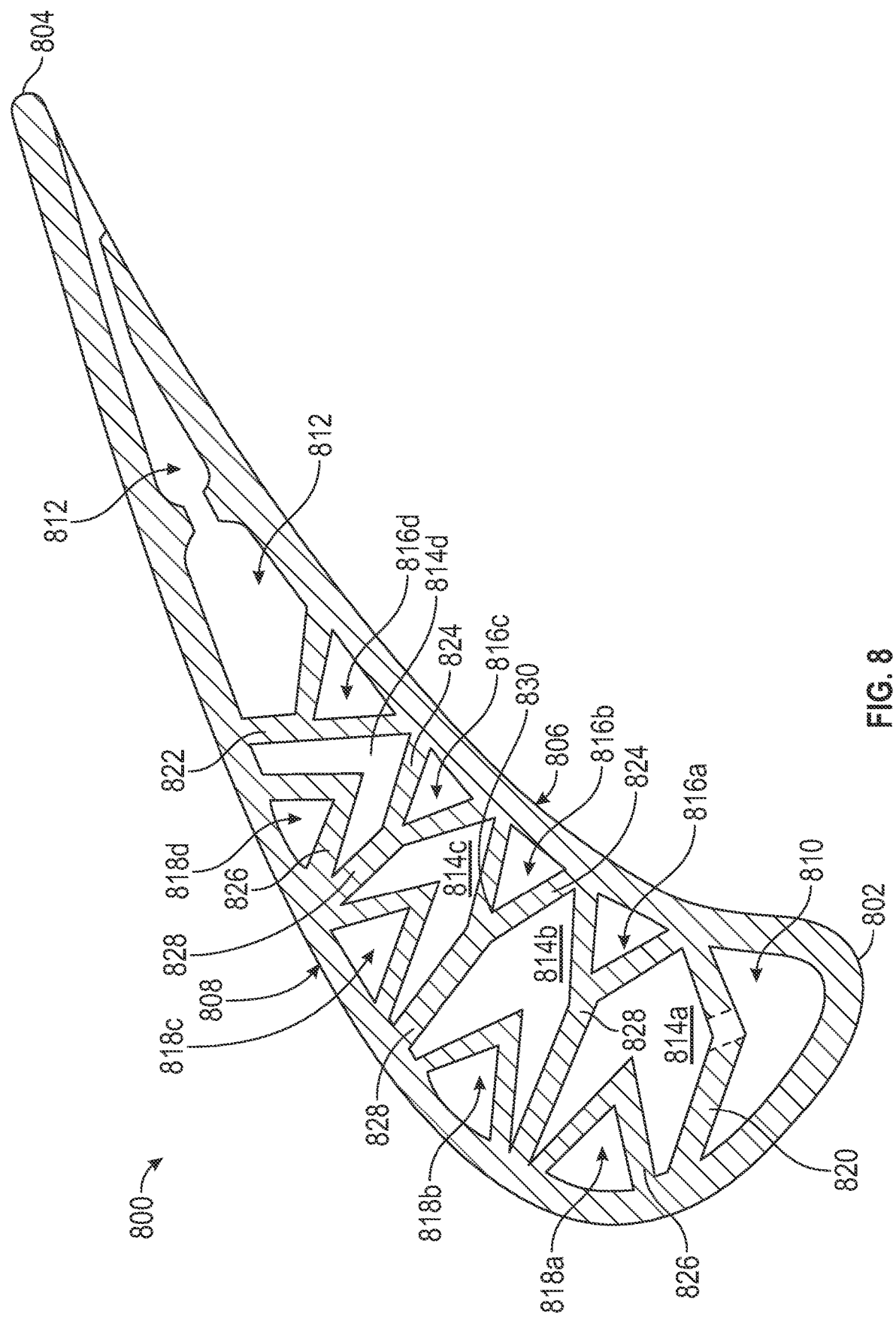
FIG. 8 is a schematic illustration of an airfoil in accordance with an embodiment of the present disclosure.

Turning now to FIG. 8, an airfoil 800 in accordance with an embodiment of the present disclosure is shown. The airfoil 800 has a similar configuration as that shown and described above with respect to FIGS. 4-7. The airfoil 800 has a leading edge 802, a trailing edge 804, a pressure side wall 806, a suction side wall 808, and a plurality of interior cooling cavities or passages. As shown, the airfoil 800 includes a leading edge cavity 810, a trailing edge cavity 812, and a main body cavity that is separated into a main body subcavities 814a-d. A number of pressure side cavities 816a-d and a number of suction side cavities 818a-d are arranged along the exterior side walls 806, 808 and provide thermal protection and definition to the main body subcavities 814a-d. The pressure side cavities 816a-d are defined by respective pressure side skin cavity walls 824 and the suction side cavities 818a-d are defined by respective suction side skin cavity walls 826. The main body subcavities 814a-d define an axially extending internal cavity (or series of cavities) that extends from a leading edge interior rib 820 at a forward end to a trailing edge interior rib 822 at an aft end.

In this embodiment, the pressure side skin cavity walls 824 are each connected to the opposite side suction side wall 808 by main body cavity ribs 828. As shown, the suction side skin cavity walls 826 do not span the airfoil 800 from the pressure side wall 806 to the suction side wall 808, but rather return to the suction side wall 808 and do not include a main body cavity rib. However, those skilled in the art will appreciate that other embodiments, in addition to or alternative to the illustrated configuration, main body cavity ribs may be connected to the apex of the suction side skin cavity walls 826 and the airfoil pressure side wall 806. In this illustrative embodiment, the main body cavity is divided into four distinct main body subcavities 814a-d. A forward or first main body cavity 814a may be fluidly connected to the leading edge cavity 810 by one or more impingement apertures. In some embodiments, the main body cavity ribs 828 may include crossover apertures to fluidly connect one or more of the main body subcavities 814a-d. The main body cavity ribs 828 may be provided to prevent bulge of the airfoil 800 during use.

In the above illustrated embodiments, the dimensions and sizes, particularly of the main body cavities, have been exaggerated in order to more illustratively shown the features of the present disclosure. As described above, the more uniform thickness of the main body cavity means that a minimum thickness of the main body cavity may be greater than 40% of a maximum thickness and there are no abrupt changes in thickness or width of the main body cavity between a largest dimension and a smallest dimension along the axial length of the main body cavity. Stated another way, the minimum thickness, usually occurring at the trailing edge end of the main body cavity near the peak of the aft-most pressure side cavity, may be greater than 40% of the maximum thickness, usually occurring at the leading edge end of the main body cavity near the location of a peak of a forward-most pressure side cavity, and the transition from the largest dimension to the smallest dimension may be substantially smooth, such that there are no abrupt changes in dimension (e.g., a substantially continuous tapering or narrowing from the leading edge end to the trailing edge end of the main body cavity). In embodiments that include multiple subcavities for the main body cavity (e.g., FIGS. 7-8), each subcavity may be bounded by these requirements of cavity dimensions.

Figure 9:
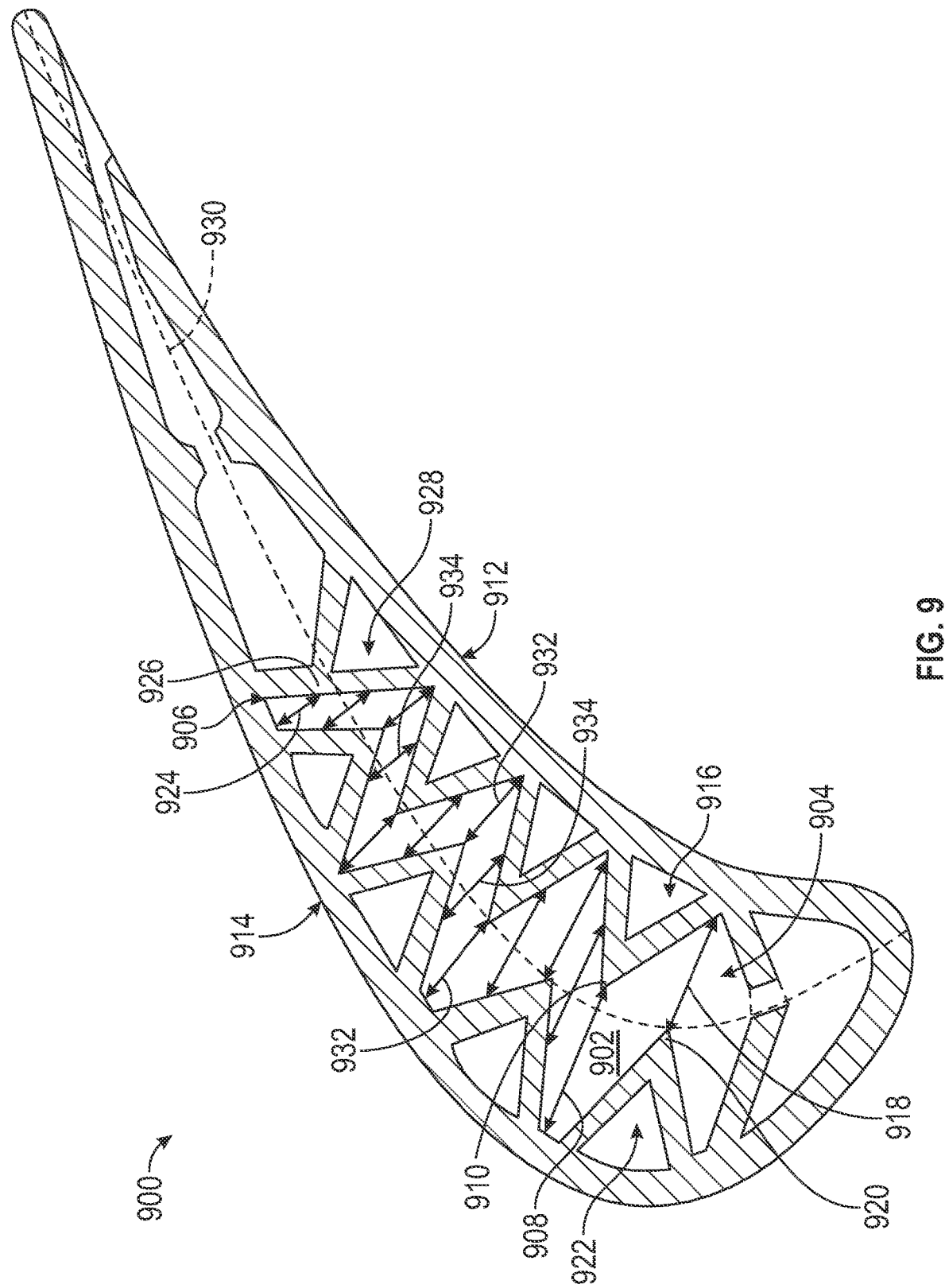
FIG. 9 is a schematic illustration of an airfoil in accordance with an embodiment of the present disclosure.

Turning now to FIG. 9, a schematic illustration of an airfoil 900 in accordance with an embodiment of the present disclosure is shown. The airfoil 900 has a main body cavity 902 extending from a forward end 904 to an aft end 906. A maximum dimension 908 is defined as the greatest distance between a forward end apex 910 and an opposing external or hot wall (e.g., either pressure side wall 912 or suction side wall 914). In this particularly illustrative embodiment, the maximum dimension 908 is from the apex 910 of the first pressure side cavity 916 to the opposite suction side wall 914. The distance 918 from the apex 920 of the first suction side cavity 922 to the opposing pressure side wall 912, in this embodiment, is less than the maximum dimension 908, even though such dimension is forward (toward the leading edge) of the maximum dimension 908. As defined herein, the maximum distance is defined by the second apex in the staggered pattern, thus allowing for modified or unique forward-end cavity configurations (e.g., proximate the leading edge cavity and due to the shape and orientation of a leading edge interior rib).

From this maximum dimension 908 and in the aftward direction (toward the trailing edge), the main body cavity 902 will narrow or taper in a width dimension along the axial span thereof, to a minimum dimension 924 that is defined as a distance between an apex 926 of the aft-most side cavity (in this case pressure side cavity 928). Defined in this manner, the minimum dimension 924 is no less than 40% of the maximum dimension 918, with a smooth taping or narrowing from the maximum dimension 918 to the minimum dimension 924. The dimensions 908, 918, 924 are measured in a direction that is normal to the mean camber line 930 of the airfoil 900.

As a result of this transition in dimension, the circumferential width of the main body cavity 902 decreases with position along the mean camber line 930 in a direction from a leading edge toward a trailing edge. This is illustratively indicated by the shortening dimensions 932, 934. In this illustration, the dimension 932 is a dimension from an apex of a side cavity to the opposing external, hot wall and the dimension 934 is a distance from a point halfway between an apex and a base of a wall/rib defining a side cavity to an opposing point halfway between an apex and a base of a wall/rib defining an opposing side cavity. As the main body cavity 902 extends aftward, the dimensions 932, 934 gradually decrease from the maximum dimension 908 to the minimum dimension 924. To achieve the decrease from the maximum dimension 908 to the minimum distance 924 in a smooth gradual way, the dimensions 932, 934 that are adjacent to each other are within 25% of each other. This reduces the likelihood of core breakage during the casting process and minimizes pressure loss during engine operations.

In one non-limiting embodiment, with reference to FIG. 9 and as described above, the dimension 932 is defined as a distance between a skin core apex and the opposite hot, exterior wall and the dimension 934 is defined as a distance between the halfway point of the skin core and the halfway point on the adjacent skin core on the opposite wall. Thus, every skin core defines one dimension 932 between apex and opposing hot wall and two dimensions 934 at the half-way point on the skin core walls to the half-way point on an opposing skin core wall (as shown in FIG. 9). Adjacent measurements are measurements taken from the peak of one skin core to the opposite wall (dimension 932) and the point halfway between that same skin core and the halfway point on the skin core on the opposite wall (dimension 934). In accordance with a non-limiting example, the distance between these two measurements (in an axial direction) is 0.200 inch or less. Thus, in accordance with some embodiments of the present disclosure, the main body cavity 908 will not vary in thickness more than 25% over an axial distance of 0.200 inch along the axial extent of the main body cavity.

Figure 10:
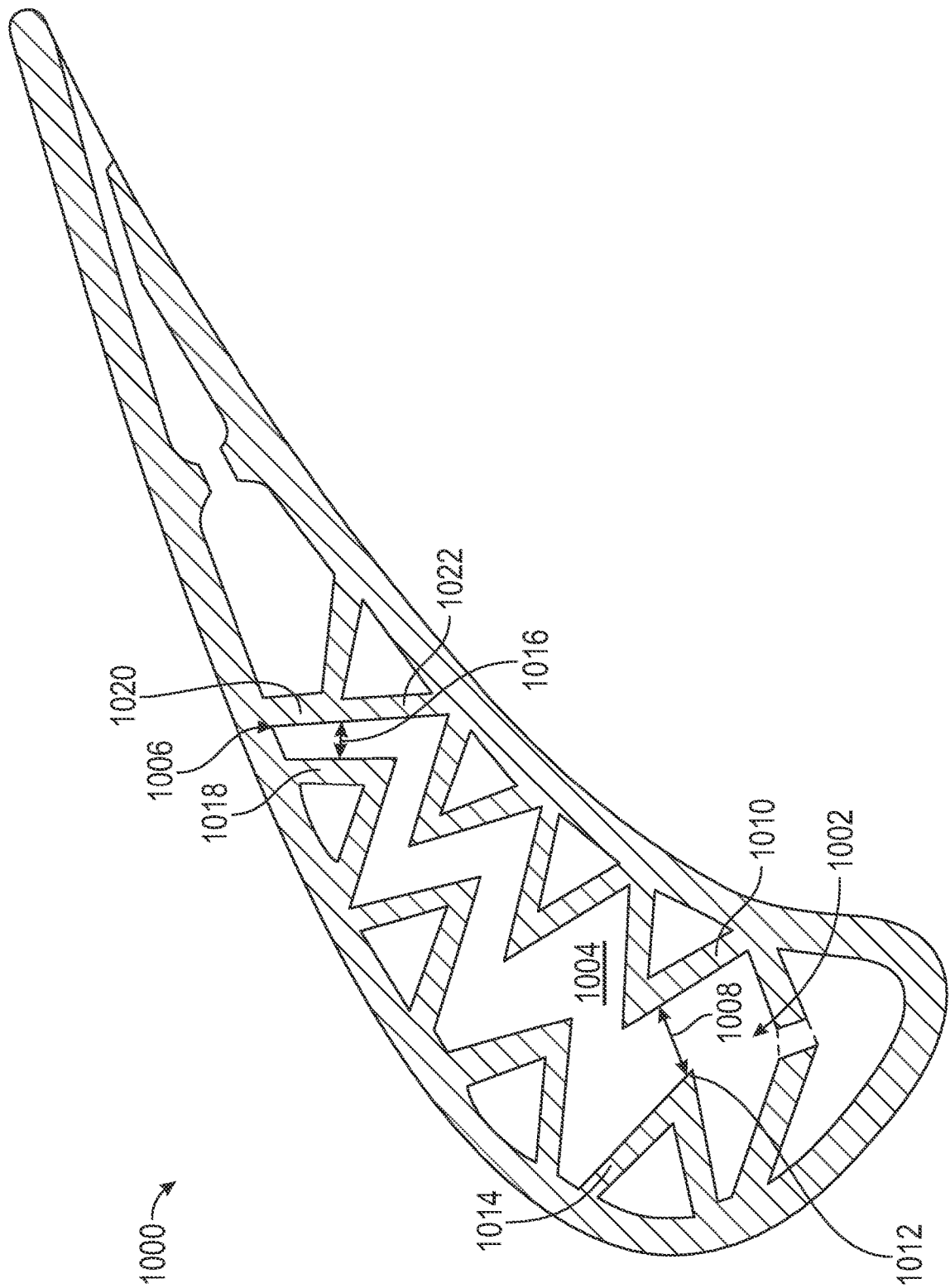
FIG. 10 is a schematic illustration of an airfoil in accordance with an embodiment of the present disclosure.

Turning now to FIG. 10, a schematic illustration of an airfoil 1000 in accordance with an embodiment of the present disclosure is shown. The illustration of FIG. 10 provides an alternative means for defining the more uniform thickness with a continuous and smooth transition from a leading edge end 1002 of a main body cavity 1004 to a trailing edge end 1006 of the main body cavity 1004. In this embodiment or means for defining the thickness or dimension of the main body cavity 1004, the dimension is based on a distance from one skin cavity wall to an opposing skin cavity wall. For example, a maximum dimension 1008 of the main body cavity 1004 may be between a first (or forwardmost) pressure side cavity wall 1010 and an apex 1012 of a first (or forwardmost) suction side cavity wall 1014. Similarly, a minimum dimension 1016 of the main body cavity 1004 may be between a last (or aftmost) suction side cavity wall 1018 and an apex 1020 of the last (or aftmost) pressure side cavity wall 1022. Similar to the embodiment of FIG. 9, the minimum dimension 1016 may be greater than 40% of the maximum dimension 1008, with a smooth transition (lessening) from the maximum dimension 1008 to the minimum dimension 1016.

Figure 11:
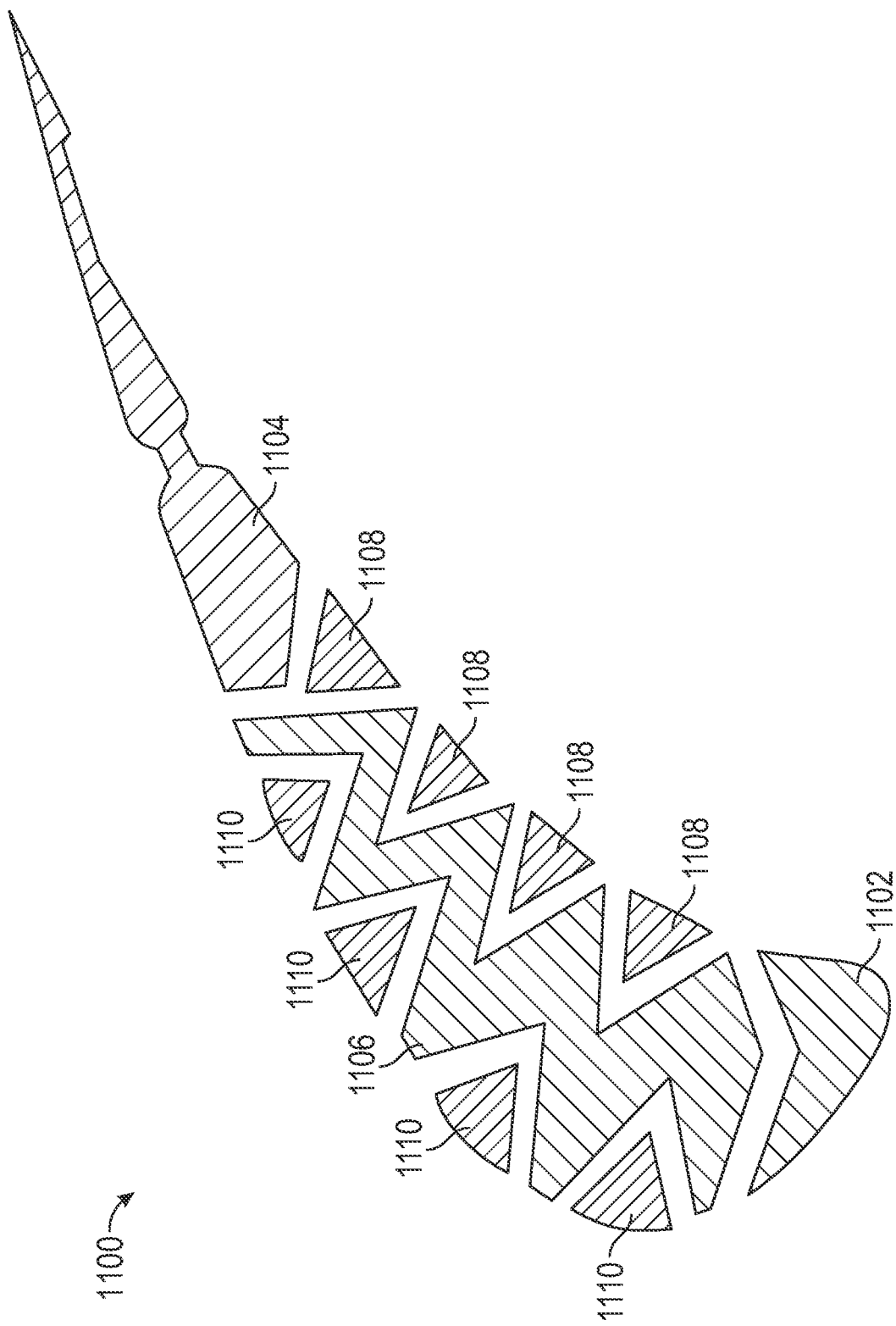
FIG. 11 schematic illustration of a core assembly for forming an airfoil in accordance with an embodiment of the present disclosure.

Turning now to FIG. 11, a schematic illustration of a core assembly 1100 in accordance with an embodiment of the present disclosure is shown. The core assembly 1100 may be used to manufacture airfoils as shown and described herein. The core assembly 1100 is formed of a number of different cores arranged to be placed within a mold or other structure to cast the final airfoil. The cores may be formed of a material that may be removed after a casting. As shown, the core assembly 1100 includes a leading edge cavity core 1102, a trailing edge cavity core 1104, a main body cavity core 1106, a number of pressure side skin cavity cores 1108, and a number of suction side skin cavity cores 1110. The main body cavity core 1106 is configured to form a main body cavity within a formed airfoil similar to that shown and described above, with a tapering thickness from a forward end toward an aft end of the main body core. The side skin cavity cores 1108, 1110 are configured to form side cavities (e.g., skin core cavities). The core assembly 1100 provides for the main body cavity core 1106 having a more uniform thickness with a trailing edge end having a thickness that is not less than 40% of a leading edge end thickness. This can minimize or prevent core breakage during a casting process and result in decreased pressure losses during engine operation that employed the cast airfoil. In embodiments that form an airfoil having multiple subcavities for the main body cavity, separate cores may be assembled and arranged to prevent such core breaking. For example, even though there may be a fluid connection between adjacent formed main body subcavities, the cores are manufactured separately and assembled together to prevent the core break issue caused by abrupt changes in core thickness.

Although a single core assembly is illustrated in FIG. 11, those of skill in the art will appreciate that each of the different airfoil configurations described herein (e.g., FIGS. 4-10) may be formed or manufactured using core assemblies similar to that described with respect to FIG. 11. However, the core assemblies may be modified to achieve the desired cooling for the various different airfoil configurations. For example, the main body cavity core may be subdivided into separate subcavity cores to form the airfoils of FIGS. 7-8. Further, in some embodiments, cross-over holes or apertures may be formed post-casting to ensure that core breakage does not occur or the risk thereof is minimized.

Figure 12:
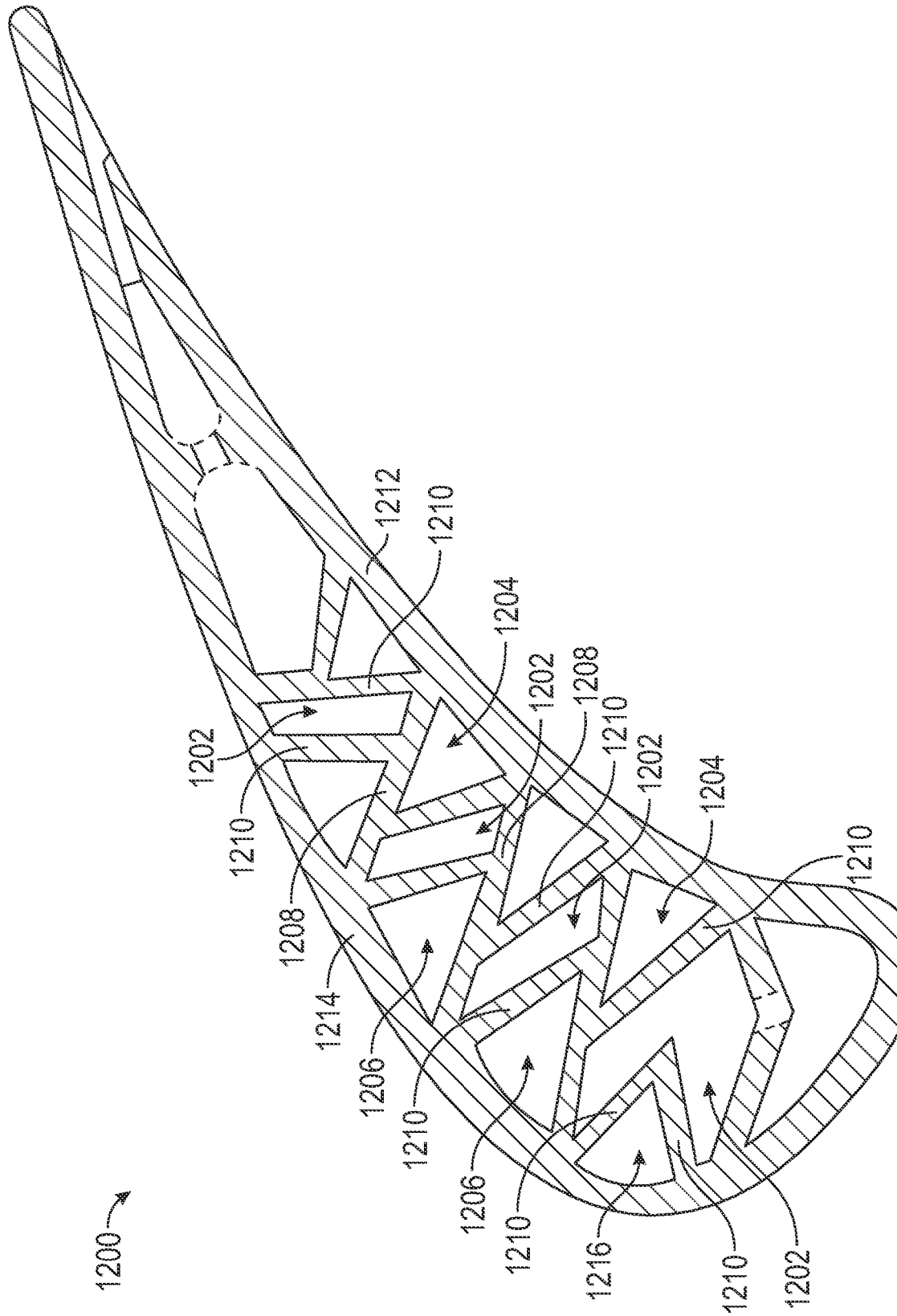
FIG. 12 is a schematic illustration of an airfoil in accordance with an embodiment of the present disclosure.

Turning now to FIG. 12, a schematic illustration of an airfoil 1200 in accordance with an embodiment of the present disclosure is shown. In the airfoil of FIG. 12, a main body cavity 1202 is separated into multiple different main body subcavities. A plurality of pressure side cavities 1204 and suction side cavities 1206, which are staggered relative to one another, are defined between full cross ribs 1208 and partial cross ribs 1210. The full cross ribs 1208 extend between a pressure side wall 1212 and a suction side wall 1214 of the airfoil 1200. In contrast, the partial cross ribs 1210 extend from one of the pressure side wall 1212 or the suction side wall 1214 and terminate at one of the full cross ribs 1208. In this illustrative embodiment, each pressure side cavity 1204 and each suction side cavity 1206 are defined by one full cross rib 1208 and one partial cross rib 1210, with the exception of a forward-most suction side cavity 1216, which is defined between two partial cross ribs 1210. Similar to the embodiments described above, the side cavities 1204, 1206 are arranged in a staggered or alternating pattern with respect to their axial position relative to each other.

Advantageously, embodiments of the present disclosure are directed to improved cooling schemes for airfoils of gas turbine engines. Improved cooling may be achieved through the inclusion of an axially extending main body cavity (or subcavities) which is protected by side cavities (e.g., skin cavities) on each of the pressure and suction sides of the main body cavity. As a result, the main body cavity, an interior airfoil cavity, will have little to no heat pickup from external hot walls, and thus cooling efficiencies may be improved. Further, the staggered (non-opposite wall connected) side cavities can enable improved producibility while maintaining a flexibility to the airfoil. In some embodiments, the airfoils may be arranged with internal main body cavity ribs that can subdivide the main body cavity into multiple subcavities. These internal main body cavity ribs can improve operational capabilities by reducing bulge of the airfoil during use.

As used herein, the term "about" and "substantially" are intended to include the degree of error associated with measurement of the particular quantity based upon the equipment available at the time of filing the application. For example, these terms may include a range of ±8%, or 5%, or 2% of a given value or other percentage change as will be appreciated by those of skill in the art for the particular measurement and/or dimensions referred to herein. Further, the terms "about" and "substantially", when associated with non-numerical limits, are intended to include degrees of errors and/or minor variations as would be apparent to those of skill in the art when considering such concepts (e.g., shapes, relative arrangements, etc.).

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
    an airfoil body having a leading edge, a trailing edge, a pressure side wall extending between the leading edge and the trailing edge and defining a pressure side, and a suction side wall extending between the leading edge and the trailing edge and defining a suction side, wherein a plurality of cooling passages are formed within the airfoil body;
    a leading edge cavity defined within the airfoil body and defined along the leading edge to provide cooling to the leading edge of the airfoil, wherein a leading edge interior rib defines an aft extent of the leading edge cavity;
    a trailing edge cavity defined within the airfoil body and defined along the trailing edge to provide cooling to the trailing edge of the airfoil, wherein a trailing edge interior rib defines a forward extent of the trailing edge cavity;
    a plurality of pressure side cavities defined by one or more pressure side skin cavity walls arranged along an interior surface of the pressure side wall, wherein at least one pressure side skin cavity wall does not extend to the suction side wall;
    a plurality of suction side cavities defined by one or more suction side skin cavity walls arranged along an interior surface of the suction side wall, wherein at least one suction side skin cavity wall does not extend to the pressure side wall; and
    a main body cavity extending between the leading edge interior rib and the trailing edge interior rib,
    wherein the plurality of pressure side cavities and the plurality of suction side cavities are arranged in a staggered pattern in a direction from the leading edge to the trailing edge, with the one or more pressure side skin cavity walls, the one or more suction side skin cavity walls, the leading edge interior rib, and the trailing edge interior rib defining the bounds of the main body cavity,
    wherein at least one of (i) a dimension of each pressure side cavity in a direction from the pressure side toward the suction side extends greater than 50% and less than 100% across the airfoil body and (ii) a dimension of each suction side cavity in a direction from the suction side toward the pressure side extends greater than 50% and less than 100% across the airfoil body.

2. The airfoil of claim 1, wherein at least one impingement aperture is formed in the leading edge interior rib and fluidly connects the main body cavity to the leading edge cavity.

3. The airfoil of claim 1, further comprising a main body cavity rib configured to divide the main body cavity into a first subcavity and a second subcavity, wherein the first subcavity is forward of the second subcavity.

4. The airfoil of claim 3, further comprising at least one crossover aperture formed in the main body cavity rib and fluidly connecting the first subcavity to the second sub cavity.

5. The airfoil of claim 3, wherein the main body cavity rib extends from an apex on one of the one or more pressure side skin cavity walls to the suction side.

6. The airfoil of claim 3, wherein the main body cavity rib extends from an apex on one of the one or more suction side skin cavity walls to the pressure side.

7. The airfoil of claim 1, wherein each of the plurality of pressure side cavities and each of the plurality of suction side cavities are triangular in shape in cross-section.

8. The airfoil of claim 1, further comprising a plurality of main body cavity ribs configured to divide the main body cavity into a plurality of main body subcavities.

9. The airfoil of claim 8, wherein at least two main body subcavities of the plurality of main body subcavities are fluidly connected by at least one crossover aperture.

10. The airfoil of claim 8, wherein each main body cavity rib extends from an apex on a pressure side skin cavity wall to the suction side wall.

11. The airfoil of claim 1, wherein the main body cavity does not vary in circumferential thickness more than 25% over an axial distance of 0.200 inch along the axial extent of the main body cavity.

12. A core assembly for manufacturing an airfoil having a leading edge, a trailing edge, a pressure side wall extending between the leading edge and the trailing edge and defining a pressure side, and a suction side wall extending between the leading edge and the trailing edge and defining a suction side, wherein a plurality of cooling passages are formed within the airfoil, the core assembly comprising:
    a leading edge cavity core configured to define a leading edge cavity within a formed airfoil body that is defined along a leading edge to provide cooling to the leading edge of the formed airfoil;
    a trailing edge cavity core configured to define a trailing edge cavity within the formed airfoil body that is defined along a trailing edge to provide cooling to the trailing edge of the formed airfoil;
    a plurality of pressure side cavity cores configured to define a plurality of formed pressure side skin cavities arranged along an interior surface of a pressure side wall of the formed airfoil body, wherein at least one formed pressure side skin cavity wall does not extend to a suction side wall of the formed airfoil body;
    a plurality of suction side cavity cores configured to define a plurality of formed suction side skin cavities arranged along an interior surface of a suction side wall of the formed airfoil body, wherein at least one formed suction side skin cavity wall does not extend to a pressure side wall of the formed airfoil body; and
    a main body cavity core positioned axially between the leading edge cavity core and the trailing edge cavity core and circumferentially between the plurality of pressure side cavity cores and the plurality of suction side cavity cores, wherein the plurality of pressure side cavity cores and the plurality of suction side cavity cores are arranged in a staggered pattern in a direction from the leading edge cavity core to the trailing edge cavity core along the main body cavity core, wherein the main body cavity core has a tapering thickness in a circumferential direction from a leading edge end of the main body cavity core toward a trailing edge end of the main body cavity core, wherein the tapering thickness decreases smoothly and the trailing edge end has a thickness that is at least 40% a thickness of the leading edge end.

13. The core assembly of claim 12, wherein the main body cavity core is separated into at least two main body subcavity cores.

14. A gas turbine engine comprising:
a turbine section;
a compressor section; and
an airfoil located in at least one of the turbine section and the compressor section, the airfoil comprising:
an airfoil body having a leading edge, a trailing edge, a pressure side wall extending between the leading edge and the trailing edge and defining a pressure side, and a suction side wall extending between the leading edge and the trailing edge and defining a suction side, wherein a plurality of cooling passages are formed within the airfoil body;
a leading edge cavity defined within the airfoil body and defined along the leading edge to provide cooling to the leading edge of the airfoil, wherein a leading edge interior rib defines an aft extent of the leading edge cavity;
a trailing edge cavity defined within the airfoil body and defined along the trailing edge to provide cooling to the trailing edge of the airfoil, wherein a trailing edge interior rib defines a forward extent of the trailing edge cavity;
a plurality of pressure side cavities defined by one or more pressure side skin cavity walls arranged along an interior surface of the pressure side wall, wherein at least one pressure side skin cavity wall does not extend to the suction side wall;
a plurality of suction side cavities defined by one or more suction side skin cavity walls arranged along an interior surface of the suction side wall, wherein at least one suction side skin cavity wall does not extend to the pressure side wall; and
a main body cavity extending between the leading edge interior rib and the trailing edge interior rib,
wherein the plurality of pressure side cavities and the plurality of suction side cavities are arranged in a staggered pattern in a direction from the leading edge to the trailing edge, with the one or more pressure side skin cavity walls, the one or more suction side skin cavity walls, the leading edge interior rib, and the trailing edge interior rib defining the bounds of the main body cavity,
wherein at least one of the pressure side cavities and the suction side cavities extends in a direction between the suction side and the pressure side for a distance that is at least 50% of a span across the airfoil body.

15. The gas turbine engine of claim 14, wherein at least one of a dimension of each pressure side cavity in a direction from the pressure side toward the suction side spans less than 100% across the airfoil body or a dimension of each suction side cavity in a direction from the suction side toward the pressure side spans less than 100% across the airfoil body.

16. The gas turbine engine of claim 14, further comprising at least one main body cavity rib configured to divide the main body cavity into at least a first subcavity and a second subcavity, wherein the first subcavity is forward of the second subcavity.

17. The gas turbine engine of claim 14, wherein each of the plurality of pressure side cavities and each of the plurality of suction side cavities are triangular in shape in cross-section.

18. An airfoil for a gas turbine engine, the airfoil comprising:
an airfoil body having a leading edge, a trailing edge, a pressure side wall extending between the leading edge and the trailing edge and defining a pressure side, and a suction side wall extending between the leading edge and the trailing edge and defining a suction side, wherein a plurality of cooling passages are formed within the airfoil body;
a leading edge cavity defined within the airfoil body and defined along the leading edge to provide cooling to the leading edge of the airfoil, wherein a leading edge interior rib defines an aft extent of the leading edge cavity;
a trailing edge cavity defined within the airfoil body and defined along the trailing edge to provide cooling to the trailing edge of the airfoil, wherein a trailing edge interior rib defines a forward extent of the trailing edge cavity;
a plurality of pressure side cavities defined by one or more pressure side skin cavity walls arranged along an interior surface of the pressure side wall, wherein at least one pressure side skin cavity wall does not extend to the suction side wall;
a plurality of suction side cavities defined by one or more suction side skin cavity walls arranged along an interior surface of the suction side wall, wherein at least one suction side skin cavity wall does not extend to the pressure side wall; and
a main body cavity extending between the leading edge interior rib and the trailing edge interior rib,
wherein the plurality of pressure side cavities and the plurality of suction side cavities are arranged in a staggered pattern in a direction from the leading edge to the trailing edge, with the one or more pressure side skin cavity walls, the one or more suction side skin cavity walls, the leading edge interior rib, and the trailing edge interior rib defining the bounds of the main body cavity,
wherein the main body cavity has a tapering thickness in a circumferential direction from a leading edge end of the main body cavity toward a trailing edge end of the main body cavity, wherein the tapering thickness decreases smoothly and the trailing edge end has a thickness that is at least 40% a thickness of the leading edge end.

* * * * *